(12) United States Patent
Irie et al.

(10) Patent No.: US 11,390,810 B2
(45) Date of Patent: Jul. 19, 2022

(54) LIQUID CRYSTAL COMPOSITION, RETARDATION FILM, METHOD FOR PRODUCING RETARDATION FILM, TRANSFER LAMINATE, OPTICAL MEMBER, METHOD FOR PRODUCING OPTICAL MEMBER, AND DISPLAY DEVICE

(71) Applicant: DAI NIPPON PRINTING CO., LTD., Tokyo-to (JP)

(72) Inventors: Shunsuke Irie, Tokyo-to (JP); Ken-ichi Okuyama, Tokyo-to (JP); Kiyohiro Takachi, Tokyo-to (JP); Mami Motooka, Tokyo-to (JP); Terutaka Takahashi, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 0 days.

(21) Appl. No.: 16/650,756

(22) PCT Filed: Sep. 25, 2018

(86) PCT No.: PCT/JP2018/035394
§ 371 (c)(1),
(2) Date: Mar. 25, 2020

(87) PCT Pub. No.: WO2019/065608
PCT Pub. Date: Apr. 4, 2019

(65) Prior Publication Data
US 2021/0189239 A1    Jun. 24, 2021

(30) Foreign Application Priority Data
Sep. 27, 2017  (JP) .............................. JP2017-186354

(51) Int. Cl.
*C09K 19/04*     (2006.01)
*G02B 5/30*      (2006.01)
*G02F 1/1333*    (2006.01)

(52) U.S. Cl.
CPC .............. *C09K 19/04* (2013.01); *G02B 5/305* (2013.01); *G02B 5/3016* (2013.01);
(Continued)

(58) Field of Classification Search
CPC ................ C09K 19/04; C09K 19/3852; C09K 2019/0448; C09K 2323/00;
(Continued)

(56) References Cited

U.S. PATENT DOCUMENTS

| | | | |
|---|---|---|---|
| 6,344,154 | B1 | 2/2002 | Coates et al. |
| 2004/0046926 | A1 | 3/2004 | Ishizaki |

(Continued)

FOREIGN PATENT DOCUMENTS

| | | |
|---|---|---|
| CN | 1589414 A | 3/2005 |
| CN | 100439948 C | 12/2008 |

(Continued)

OTHER PUBLICATIONS

Dec. 25, 2018 International Search Report issued in International Patent Application No. PCT/JP2018/035394.
(Continued)

*Primary Examiner* — Ruiyun Zhang
(74) *Attorney, Agent, or Firm* — Oliff PLC

(57) ABSTRACT

A liquid crystal composition containing a side-chain liquid crystal polymer, a polymerizable liquid crystal compound, and a photopolymerization initiator, wherein the side-chain liquid crystal polymer contains a constitutional unit which is represented by the following general formula (I) and a liquid
(Continued)

crystal constitutional unit which contains a side chain including a liquid crystal moiety:

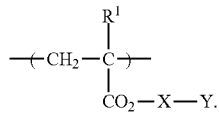

General Formula (I)

8 Claims, 2 Drawing Sheets

(52) U.S. Cl.
CPC .......... *G02F 1/133365* (2013.01); *C09K 2019/0448* (2013.01); *C09K 2323/00* (2020.08); *C09K 2323/03* (2020.08); *C09K 2323/035* (2020.08); *G02F 2202/022* (2013.01)

(58) Field of Classification Search
CPC .......... C09K 2323/03; C09K 2323/035; G02B 5/3016; G02B 5/305; G02B 5/3083; G02F 1/13365
USPC ...... 428/1.1, 1.3; 349/117, 157; 252/299.01, 252/299.63, 299.67
See application file for complete search history.

(56) References Cited

U.S. PATENT DOCUMENTS

| | | | |
|---|---|---|---|
| 2005/0037155 A1* | 2/2005 | Shuto | G02B 5/3016 428/1.1 |
| 2005/0227021 A1 | 10/2005 | Harding et al. | |
| 2011/0090439 A1 | 4/2011 | Nakamura et al. | |
| 2018/0046034 A1 | 2/2018 | Lim et al. | |
| 2019/0136134 A1 | 5/2019 | Okuyama et al. | |

FOREIGN PATENT DOCUMENTS

| | | | |
|---|---|---|---|
| CN | 102043185 A | 5/2011 |
| CN | 104177881 A | 12/2014 |
| CN | 109415464 A | 3/2019 |
| JP | 2000-507932 A | 6/2000 |
| JP | 2003-149441 A | 5/2003 |
| JP | 2005-120091 A | 5/2005 |
| JP | 2005-272561 A | 10/2005 |
| JP | 2007-332230 A | 12/2007 |
| JP | 2011-128584 A | 6/2011 |
| JP | 2014-123068 A | 7/2014 |
| JP | 2015-007700 A | 1/2015 |
| JP | 2015-197526 A | 11/2015 |
| JP | 2018-095736 A | 6/2018 |
| KR | 2015-0093447 A | 8/2015 |
| WO | 2016/167231 A1 | 10/2016 |

OTHER PUBLICATIONS

Takehiko Fujimoto, "The Handbook of surfactants", Sanyo Chemical Industries, Ltd., Jun. 1, 2007, Section II, Chapter 6 (The relationship between the chemical structure and physical properties of surfactants) pp. 140-166.
J.T Davies and E.K. Rideal, "Disperse Systems and Adhesion," Interfacial Phenomena, Academic Press, New York, 1963, pp. 343-450.
Office Action dated Jun. 8, 2020 in U.S. Appl. No. 16/313,689.
Office Action dated Mar. 17, 2021 in U.S. Appl. No. 16/313,689.
Jul. 12, 2021 Office Action issued in U.S. Appl. No. 16/313,689.
Oct. 20, 2021 Office Action Issued in U.S. Appl. No. 16/313,689.
Jan. 20, 2022 Notice of Allowance issued in U.S. Appl. No. 16/313,689.

* cited by examiner

LIQUID CRYSTAL COMPOSITION, RETARDATION FILM, METHOD FOR PRODUCING RETARDATION FILM, TRANSFER LAMINATE, OPTICAL MEMBER, METHOD FOR PRODUCING OPTICAL MEMBER, AND DISPLAY DEVICE

TECHNICAL FIELD

The present disclosure relates to a liquid crystal composition, a retardation film, a method for producing the retardation film, a transfer laminate, an optical member, a method for producing the optical member, and a display device.

BACKGROUND ART

Hitherto, about display devices such as a liquid crystal display device and a light emitting display device, a structure has been suggested in which various optical members are arranged onto their panel plane. For such an optical member, suggested is also a structure to which retardation is given by a liquid crystal material.

For example, in a light emitting display device such as an organic light emitting display device, a metallic electrode excellent in reflectivity is fitted thereto in order to use light from its light emitting layer effectively. In the meantime, the use of the metallic electrode makes the reflection of external light large. Thus, the light emitting display device has, for example, a circularly polarizing plate to restrain the external light reflection.

Light transmitted through a polarizing plate has an optical anisotropy. This anisotropy causes a display device to be, for example, lowered in contrast dependently on the viewing angle. By contrast, a method is known in which a retardation film, particularly, a positive C type retardation film (positive C plate) is used to improve the viewing angle.

The positive C plate can be yielded, for example, by aligning rodlike liquid crystal molecules in its plate homeotropically to the plane of the plate.

For example, Patent Literature 1 discloses a retardation plate having a homeotropic alignment liquid crystal film made of a homeotropic alignment liquid crystal composition containing a specific homeotropic alignment side-chain liquid crystal polymer, and a photopolymerizable liquid crystal compound.

CITATION LIST

Patent Literature 1: JP 2003-149441 A

SUMMARY OF INVENTION

Technical Problem

As display devices containing a retardation film are increasingly used for various kinds of purposes, the retardation film is faced with a demand for improvement in endurance properties such as heat resistance. However, positive C plates known in the prior art has problems such that the heat resistance is insufficient, and a retardation change is likely to be caused by heat.

An object of the embodiment in the present disclosure is to provide a liquid crystal composition capable of forming a retardation layer excellent in homeotropic alignment property and improved in heat resistance; a retardation film containing a retardation layer excellent in homeotropic alignment property and improved in heat resistance; a transfer laminate configured to transfer a retardation layer excellent in homeotropic alignment property and improved in heat resistance; an optical member containing the retardation film; a method for producing the optical member; and a display device.

Solution to Problem

One embodiment in the present disclosure provides a liquid crystal composition containing a side-chain liquid crystal polymer, a polymerizable liquid crystal compound, and a photopolymerization initiator, wherein the side-chain liquid crystal polymer contains a constitutional unit which is represented by the following general formula (I) and a liquid crystal constitutional unit which contains a side chain including a liquid crystal moiety:

General Formula (I)

where $R^1$ is a hydrogen atom or a methyl group; X is a hydrophilic moiety; Y is a hydrophobic moiety; X as the hydrophilic moiety is $-(C_2H_4O)_n-$ (where n is 2 or more and 17 or less), a combination of a hydroxyl-substituted, saturated aliphatic hydrocarbon group containing 1 or more and 5 or less carbon atoms and at least one linking group selected from the group consisting of $-O-$, $-O-C(=O)-$, $-C(=O)-O-$, $-NR^2-C(=O)-$ and $-C(=O)-NR^2-$, or a combination of $-(C_2H_4O)_{n'}-$ (where n' is 1 or more and 17 or less), a saturated aliphatic hydrocarbon group containing 1 or more and 5 or less carbon atoms and optionally being substituted by a hydroxyl group, and the linking group; $R^2$ is a hydrogen atom or a methyl group; and Y as the hydrophobic moiety is an aliphatic hydrocarbon group containing 4 or more and 22 or less carbon atoms, an aromatic hydrocarbon group containing 6 or more and 12 or less carbon atoms, a combination of an aliphatic hydrocarbon group containing 1 or more and 22 or less carbon atoms and an aromatic hydrocarbon group containing 6 or more and 12 or less carbon atoms, or a combination of $-(C_3H_6O)_m-$ (where m is 1 or more and 5 or less) and at least one selected from an aliphatic hydrocarbon group containing 4 or more and 22 or less carbon atoms and an aromatic hydrocarbon group containing 6 or more and 12 or less carbon atoms.

One embodiment in the present disclosure provides a liquid crystal composition containing a side-chain liquid crystal polymer, a polymerizable liquid crystal compound, and a photopolymerization initiator, wherein the side-chain liquid crystal polymer contains a constitutional unit which is represented by the following general formula (I') and a liquid crystal constitutional unit which contains a side chain including a liquid crystal moiety:

General Formula (I')

where $R^1$ is a hydrogen atom or a methyl group; X' is a hydrophilic moiety; Y' is a hydrophobic moiety; X' as the hydrophilic moiety is a divalent group wherein a specific cardinal number of an atomic group by the Davies method, is 0.5 or more and 5.7 or less; and Y' as the hydrophobic moiety is a monovalent group wherein a specific cardinal number of an atomic group by the Davies method, is −10.5 or more and −3.0 or less.

One embodiment in the present disclosure provides the liquid crystal composition wherein a mass ratio of the side-chain liquid crystal polymer is 1% by mass or more and 25% by mass or less, with respect to a total mass of the side-chain liquid crystal polymer and the polymerizable liquid crystal compound.

One embodiment in the present disclosure provides a retardation film containing a retardation layer, wherein the retardation layer contains a cured product of a liquid crystal composition containing a side-chain liquid crystal polymer and a polymerizable liquid crystal compound, and wherein the side-chain liquid crystal polymer contains a constitutional unit which is represented by the general formula (I) or (I') and a liquid crystal constitutional unit which contains a side chain including a liquid crystal moiety.

One embodiment in the present disclosure provides the retardation film wherein a mass ratio of the side-chain liquid crystal polymer is 1% by mass or more and 25% by mass or less, with respect to a total mass of the side-chain liquid crystal polymer and the polymerizable liquid crystal compound.

One embodiment in the present disclosure provides the retardation film wherein a thickness direction retardation Rth (550) at a measuring wavelength of 550 nm of the retardation layer is less than −80 nm.

One embodiment in the present disclosure provides a method for producing a retardation film, wherein a retardation layer is formed by:

a step of forming, into a film, the liquid crystal composition in the embodiment in the present disclosure, a step of aligning the liquid crystal constitutional unit of the side-chain liquid crystal polymer and the polymerizable liquid crystal compound in the liquid crystal composition formed into the film, and a step of polymerizing the polymerizable liquid crystal compound after the aligning step.

One embodiment in the present disclosure provides a transfer laminate configured to transfer a retardation layer, wherein the transfer laminate contains a retardation layer and a support supporting the retardation layer in a removable manner;

wherein the retardation layer contains a cured product of a liquid crystal composition containing a side-chain liquid crystal polymer and a polymerizable liquid crystal compound; and wherein the side-chain liquid crystal polymer contains a constitutional unit which is represented by the general formula (I) or (I') and a liquid crystal constitutional unit which contains a side chain including a liquid crystal moiety.

One embodiment in the present disclosure provides the transfer laminate wherein a mass ratio of the side-chain liquid crystal polymer is 1% by mass or more and 25% by mass or less, with respect to a total mass of the side-chain liquid crystal polymer and the polymerizable liquid crystal compound.

One embodiment in the present disclosure provides the transfer laminate wherein a thickness direction retardation Rth (550) at a measuring wavelength of 550 nm of the retardation layer is less than −80 nm.

One embodiment in the present disclosure provides an optical member containing the retardation film in the embodiment in the present disclosure and a polarization plate disposed thereon.

One embodiment in the present disclosure provides a method for producing an optical member, the method containing:

a step of preparing the transfer laminate in the embodiment in the present disclosure, a transfer step in which a transfer receiving object containing at least a polarization plate, is faced to the retardation layer of the transfer laminate, and the transfer laminate is transferred onto the transfer receiving object, and a removal step in which the support is removed from the transfer laminate transferred onto the transfer receiving object.

One embodiment in the present disclosure provides a display device containing the retardation film in the embodiment in the present disclosure or containing an optical member containing the retardation film in the embodiment in the present disclosure and a polarization plate disposed thereon.

Advantageous Effects of Invention

The embodiments in the present disclosure can provide a liquid crystal composition capable of forming a retardation layer excellent in homeotropic alignment property and improved in heat resistance; a retardation film containing a retardation layer excellent in homeotropic alignment property and improved in heat resistance; a transfer laminate configured to transfer a retardation layer excellent in homeotropic alignment property and improved in heat resistance; an optical member containing the retardation film; a method for producing the optical member; and a display device.

DESCRIPTION OF EMBODIMENTS

Figure 1:
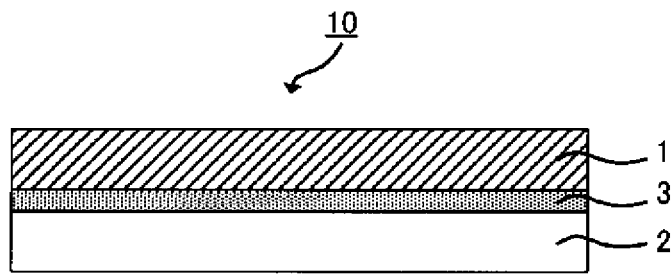
FIG. 1 is a schematic sectional view showing an embodiment of a retardation film.

Hereinafter, descriptions will be made about embodiments, examples and others in the present disclosure with reference to the drawings and so on. However, about the present disclosure, many different embodiments can be carried out. Thus, the present invention should not be interpreted with any limitation to described contents of the present embodiments, the examples, and the others, which will be given as examples. In order to make a description about each of the drawings clearer, the width, the thickness, the shape and any other factors of each part or portion therein may be schematically illustrated, differently from that of a part or portion in an actual form. However, the illustrated factors are each a mere example not to limit the interpretation of the present disclosure. In the document DESCRIPTION, and each of the drawings, to the same element as in any one of the drawings referred to already is attached the same reference number; thus, a detailed description thereabout is appropriately omitted. For the convenience of the descriptions, any word such as a word "upward" or "downward" may be used. However, the direction represented by the word may be flipped upside down.

In the DESCRIPTION, in a case where, for example, any member or a constituent of any region is "on (or beneath) of a different member or a constituent of a different region, examples of this case include not only a case where the member is just on (or just beneath) of the different constituent, but also a case where the member or the constituent is over or above (or under or below) of the different constituent, that is, a case where an additional member is included between the two to be over or above (or under or below) the constituent unless otherwise specified.

The alignment-regulating force in the present DESCRIPTION means an interaction that causes a liquid crystal component in a retardation layer to be arranged in a specific direction.

In the present DESCRIPTION, the wording "(meth)acryl(ic)" denotes each of the words "acryl(ic) and methacryl(ic)". The wording "(meth)acryloyl" denotes each of words "acryloyl" and "methacryloyl".

In the present DESCRIPTION, the terms "plate", "sheet" and "film" should not be distinguished from each other on the basis of a difference between their designations. The wording "film plane (plate plane or sheet plane)" denotes the following when a film-form (plate-form or sheet-form) member which is a target is viewed wholly and macroscopically: a plane of the film-form member (plate-form member or sheet-form member), which is the target, the direction of this plane being consistent with the flat plane direction of the member.

A. Liquid Crystal Composition

A liquid crystal composition in a first embodiment in the present disclosure is a liquid crystal composition containing a side-chain liquid crystal polymer, a polymerizable liquid crystal compound, and a photopolymerization initiator, wherein the side-chain liquid crystal polymer contains a constitutional unit which is represented by the following general formula (I) and a liquid crystal constitutional unit which contains a side chain including a liquid crystal moiety:

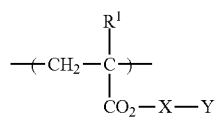

General Formula (I)

where $R^1$ is a hydrogen atom or a methyl group; X is a hydrophilic moiety; Y is a hydrophobic moiety; X as the hydrophilic moiety is $-(C_2H_4O)_n-$ (where n is 2 or more and 17 or less), a combination of a hydroxyl-substituted, saturated aliphatic hydrocarbon group containing 1 or more and 5 or less carbon atoms and at least one linking group selected from the group consisting of $-O-$, $-O-C(=O)-$, $-C(=O)-O-$, $-NR^2-C(=O)-$ and $-C(=O)-NR^2-$, or a combination of $-(C_2H_4O)_n-$ (where n' is 1 or more and 17 or less), a saturated aliphatic hydrocarbon group containing 1 or more and 5 or less carbon atoms and optionally being substituted by a hydroxyl group, and the linking group; $R^2$ is a hydrogen atom or a methyl group; and Y as the hydrophobic moiety is an aliphatic hydrocarbon group containing 4 or more and 22 or less carbon atoms, an aromatic hydrocarbon group containing 6 or more and 12 or less carbon atoms, a combination of an aliphatic hydrocarbon group containing 1 or more and 22 or less carbon atoms and an aromatic hydrocarbon group containing 6 or more and 12 or less carbon atoms, or a combination of $-(C_3H_6O)_m-$ (where m is 1 or more and 5 or less) and at least one selected from an aliphatic hydrocarbon group containing 4 or more and 22 or less carbon atoms and an aromatic hydrocarbon group containing 6 or more and 12 or less carbon atoms.

A liquid crystal composition in a second embodiment in the present disclosure is a liquid crystal composition containing a side-chain liquid crystal polymer, a polymerizable liquid crystal compound, and a photopolymerization initiator, wherein the side-chain liquid crystal polymer contains a constitutional unit which is represented by the following general formula (I') and a liquid crystal constitutional unit which contains a side chain including a liquid crystal moiety:

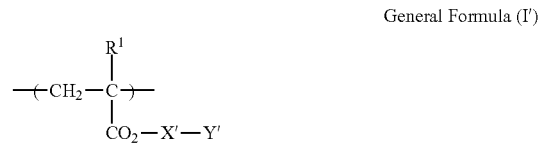

General Formula (I')

where $R^1$ is a hydrogen atom or a methyl group; X' is a hydrophilic moiety; Y' is a hydrophobic moiety; X' as the hydrophilic moiety is a divalent group wherein a specific cardinal number of an atomic group by the Davies method, is 0.5 or more and 5.7 or less; and Y' as the hydrophobic moiety is a monovalent group wherein a specific cardinal number of an atomic group by the Davies method, is −10.5 or more and −3.0 or less.

Since the liquid crystal composition in the present disclosure contains the side-chain liquid crystal polymer, a retardation layer excellent in homeotropic alignment property and improved in heat resistance can be formed. Operation for exhibiting such advantageous effect by the liquid crystal composition has not yet been partially made clear. However, it is presumed as follows.

A positive C type retardation film (positive C plate) can be yielded by forming a coating film of the liquid crystal composition on a substrate or alignment membrane and appropriately heating the coating film to homeotropically align the liquid crystal component in the liquid crystal composition with respect to the substrate or alignment membrane.

The liquid crystal composition in the present disclosure contains, as the liquid crystal component, a side-chain liquid crystal polymer and a polymerizable liquid crystal compound, and the side-chain liquid crystal polymer contains a liquid crystal constitutional unit which contains a side chain including a liquid crystal moiety and a constitutional unit which is represented by the general formula (I) or (I'). A side chain of the constitutional unit represented by the general formula (I) or (I') contains the hydrophilic moiety and the hydrophobic moiety in this order, starting from the main chain, via the —C(=O)—O— group. Meanwhile, the substrate or alignment membrane used to form the retardation layer generally contains a polar group on the surface thereof. Accordingly, the affinity between the hydrophilic moiety of the constitutional unit represented by the general formula (I) or (I') and the substrate or alignment membrane is high, and the affinity between the hydrophobic moiety and the substrate or alignment membrane is low. Accordingly, when the liquid crystal composition in the present disclosure is applied onto the substrate or alignment membrane to form the coating film, there is a tendency that the hydrophilic moiety near the main chain gets close to the substrate or alignment membrane, and the hydrophobic moiety gets clear of the substrate or alignment membrane. Accordingly, in the side-chain liquid crystal polymer in the coating film, it is estimated that the hydrophilic moiety attaches to the substrate or alignment membrane or is unevenly located therearound, and subsequently, the main chain also attaches to the substrate or alignment membrane or is unevenly located therearound; moreover, it is estimated that the hydrophobic moiety does not attach to the substrate or alignment membrane and is likely to be homeotropically aligned with respect to the substrate or alignment membrane. Accordingly, it is thought that when the coating film of the liquid crystal composition is appropriately heated to homeotropically align the side chain of the liquid crystal constitutional unit with respect to the substrate or alignment membrane, as described above, the homeotropically aligned hydrophobic moiety induces the homeotropic alignment of the side chain of the liquid crystal constitutional unit to improve the homeotropic alignment property, and the homeotropic alignment is easily maintained. Also in the retardation layer formed by use of the liquid crystal composition in the present disclosure, as just described, since the homeotropic alignment of the liquid crystal component is easily maintained, the liquid crystal component easily maintains its homeotropic alignment even after heating; a retardation change induced by heating is less likely to occur; and excellent heat resistance is obtained.

In a liquid crystal composition known in the prior art, as a liquid crystal component, a large amount of liquid crystal polymer is needed to be contained to obtain sufficient alignment property. When the content of the liquid crystal polymer is large, the content of the polymerizable liquid crystal compound is relatively small. Accordingly, the crosslinking density of the retardation layer decreases. As a result, the retardation layer is poor in endurance properties such as heat resistance, and a retardation change induced by heating, for example, is likely to occur. Meanwhile, in the liquid crystal composition in the present disclosure, since the side-chain liquid crystal polymer used as the liquid crystal polymer is excellent in homeotropic alignment property, even when the content of the liquid crystal polymer is small, the retardation layer excellent in homeotropic alignment property and heat resistance can be formed. In the liquid crystal composition in the present disclosure, since the content of the liquid crystal polymer can be small, the content of the polymerizable liquid crystal compound can be large and, as a result, the heat resistance and so on of the retardation layer can be further improved. Due to containing the side-chain liquid crystal polymer, the retardation layer formed by use of the liquid crystal composition in the present disclosure, is excellent in homeotropic alignment property, has sufficient endurance properties such as heat resistance, and is less likely to cause a retardation change induced by heating, even when the content of the polymerizable liquid crystal compound is small.

The liquid crystal composition in the present disclosure includes at least a side-chain liquid crystal polymer, a polymerizable liquid crystal compound, and a photopolymerization initiator, and may further include a different component as far as the advantageous effects thereof are not impaired. Hereinafter, the individual components included in the liquid crystal composition will be described in turn. The first and second embodiments of the side-chain liquid crystal polymer will be separately explained. Components other than the side-chain liquid crystal polymer are common to the first and second embodiments.

<Side-Chain Liquid Crystal Polymer>

In the liquid crystal composition in the first embodiment in the present disclosure, the side-chain liquid crystal polymer contains a constitutional unit which is represented by the general formula (I) and a liquid crystal constitutional unit which contains a side chain including a liquid crystal moiety. The liquid crystal composition in the first embodiment in the present disclosure can show the homeotropic alignment property.

(1) Constitutional Unit Represented by General Formula (I)

In the general formula (I), X as the hydrophilic moiety is:

(x1) —$(C_2H_4O)_n$— (where n is 2 or more and 17 or less), (x2) a combination of a hydroxyl-substituted, saturated aliphatic hydrocarbon group containing 1 or more and 5 or less carbon atoms and at least one linking group selected from the group consisting of —O—, —O—C(=O)—, —C(=O)—O—, —$NR^2$—C(=O)— and —C(=O)—$NR^2$—, or (x3) a combination of —$(C_2H_4O)_{n'}$— (where n' is 1 or more and 17 or less), a saturated aliphatic hydrocarbon group containing 1 or more and 5 or less carbon atoms and optionally being substituted by a hydroxyl group, and the linking group.

Also in the general formula (I), $R^2$ is a hydrogen atom or a methyl group.

The hydrophilic moiety X in the general formula (I) is preferably the above-defined (x1) or (x3) from the viewpoint of the homeotropic alignment property and heat resistance.

From the viewpoint of further improving the homeotropic alignment property and heat resistance, the linking group in the hydrophilic moiety X is preferably at least one selected from the group consisting of —O—, —O—C(=O)— and —C(=O)—O—.

The total number of carbon atoms in the hydrophilic moiety X is preferably 3 or more and 34 or less, and more preferably 4 or more and 16 or less, from the viewpoint of further improving the homeotropic alignment property and heat resistance.

Also, n in the above-defined (x1) —$(C_2H_4O)_n$— as the hydrophilic moiety X is an integer of 2 or more and 17 or less, more preferably 3 or more and 17 or less, and even more preferably 4 or more and 16 or less.

In the above-defined (x2) as the hydrophilic moiety X (that is, in the combination of a hydroxyl-substituted, saturated aliphatic hydrocarbon group containing 1 or more and 5 or less carbon atoms and at least one linking group selected from the group consisting of —O—, —O—C(=O)—, —C(=O)—O—, —$NR^2$—C(=O)— and —C(=O)—$NR^2$—), the linking group may be contained in the terminal of the saturated aliphatic hydrocarbon group or may be contained in the chain. The linking group is preferably contained in one terminal of the saturated aliphatic hydrocarbon group.

In the above-defined (x2), the number of the contained linking group is preferably 3 or less, more preferably 2 or less, and even more preferably 1.

In the above-defined (x2), the number of the hydroxyl group contained in the hydroxyl-substituted, saturated aliphatic hydrocarbon group is preferably 1 or 2, and more preferably 1.

In the above-defined (x2), the hydroxyl-substituted, saturated aliphatic hydrocarbon group may be any of linear, branched and cyclic. The hydroxyl-substituted, saturated aliphatic hydrocarbon group is preferably linear. The number of carbon atoms in the hydroxyl-substituted, saturated aliphatic hydrocarbon group is in particular preferably 2 or more and 5 or less.

Preferred and specific examples of the above-defined (x2) as the hydrophilic moiety X include a divalent group represented by the following general formula (X-1).

General Formula (X-1)

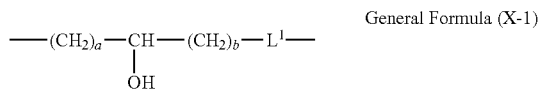

where a and b are each independently an integer of 1 or more and 3 or less; a+b is 2 or more and 4 or less; and $L^1$ is —O—, —O—C(=O)— or —C(=O)—O—.

In the above-defined (x3) as the hydrophilic moiety X (that is, in the combination of —$(C_2H_4O)_{n'}$—, a saturated aliphatic hydrocarbon group containing 1 or more and 5 or less carbon atoms and optionally being substituted by a hydroxyl group, and the linking group), n' is an integer of 1 or more and 17 or less, preferably 2 or more and 8 or less, and more preferably 2 or more and 4 or less.

In the above-defined (x3), the saturated aliphatic hydrocarbon group optionally being substituted by a hydroxyl group, may be any of linear, branched and cyclic. The saturated aliphatic hydrocarbon group is preferably linear. The number of carbon atoms in the saturated aliphatic hydrocarbon group is in particular preferably 2 or more and 5 or less.

In the above-defined (x3), when a hydroxyl group is bound by substitution to the saturated aliphatic hydrocarbon group, the number of the hydroxyl group bound by substitution is preferably 1 or 2, and more preferably 1.

For the combination of a saturated aliphatic hydrocarbon group containing 1 or more and 5 or less carbon atoms and optionally being substituted by a hydroxyl group and the linking group in the above-defined (x3), the linking group is preferably contained in the terminal of the saturated aliphatic hydrocarbon group. The number of the contained linking group may be 2 or more, and the linking group may be contained between the saturated aliphatic hydrocarbon groups.

The combination of —$(C_2H_4O)_{n'}$— and a saturated aliphatic hydrocarbon group including the linking group and optionally being substituted by a hydroxyl group in the above-defined (x3), may be a combination of one or more —$(C_2H_4O)_{n'}$— and one or more saturated aliphatic hydrocarbon groups each including the linking group and optionally being substituted by a hydroxyl group. The combination is in particular preferably one —$(C_2H_4O)_{n'}$— and one saturated aliphatic hydrocarbon group including the linking group and optionally being substituted by a hydroxyl group.

Preferred and specific examples of the above-defined (x3) as the hydrophilic moiety X include a divalent group represented by the following general formula (X-2).

General Formula (X-2)

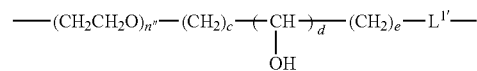

where n" is an integer of 1 or more and 4 or less; $L^{1'}$ is —O—, —O—C(=O)—, —C(=O)—O—, —$NR^2$—C(=O)— or —C(=O)—$NR^2$—; $R^2$ is a hydrogen atom or a methyl group; c, d and e are each independently an integer of 0 or more and 5 or less and a direct bond when 0; and c+d+e is 1 or more and 5 or less.

For the hydrophilic moiety X, the ratio of the carbon atom number to the total of the oxygen atom number and the nitrogen atom number {(carbon atom number)/(total of oxygen atom number and nitrogen atom number)} is preferably 1.3 or more and 2.6 or less, from the viewpoint of the homeotropic alignment property and heat resistance, and more preferably 1.8 or more and 2.4 or less.

In the general formula (I), Y as the hydrophobic moiety is:
(y1) an aliphatic hydrocarbon group containing 4 or more and 22 or less carbon atoms,
(y2) an aromatic hydrocarbon group containing 6 or more and 12 or less carbon atoms,
(y3) a combination of an aliphatic hydrocarbon group containing 1 or more and 22 or less carbon atoms and an aromatic hydrocarbon group containing 6 or more and 12 or less carbon atoms, or
(y4) a combination of —$(C_3H_6O)_m$— (where m is 1 or more and 5 or less) and at least one selected from an aliphatic hydrocarbon group containing 4 or more and 22 or less carbon atoms and an aromatic hydrocarbon group containing 6 or more and 12 or less carbon atoms.

In the general formula (I), —$(C_3H_6O)_m$— is —$(CH_2CH_2CH_2O)_{m1}$—, —$(C(CH_3)HCH_2O)_{m2}$—, —$(CH_2C(CH_3)HO)_{m3}$— or any combination thereof. Also, m1, m2 and m3 are each the number of repeating units. In particular, —$(C_3H_6O)_m$— in the general formula (I) preferably contains —$(CH_2CH_2CH_2O)_{m1}$—.

The hydrophobic moiety Y in the general formula (I) is in particular preferably the above-defined (y1), (y2) or (y3), and more preferably the above-defined (y1) or (y3) from the viewpoint of the homeotropic alignment property and heat resistance. Also, Y in the general formula (I) preferably contains an aromatic hydrocarbon group, since the temperature range in which the liquid crystal component is aligned, is widened, resulting in easy temperature control and wide process margin.

The aliphatic hydrocarbon group of the above-defined (y1) as the hydrophobic moiety Y may be any of a saturated aliphatic hydrocarbon group and an unsaturated aliphatic hydrocarbon group. Also, the aliphatic hydrocarbon group may be any of linear, branched and cyclic. The aliphatic hydrocarbon group of the above-defined (y1) is in particular preferably a saturated aliphatic hydrocarbon group; the aliphatic hydrocarbon group more preferably contains a linear saturated aliphatic hydrocarbon group; and the aliphatic hydrocarbon group even more preferably contains a linear saturated aliphatic hydrocarbon group containing 9 or more carbon atoms. Also, the number of carbon atoms in the aliphatic hydrocarbon group of the above-defined (y1) is preferably 15 or less from the viewpoint of the homeotropic alignment property.

Examples of the above-defined (y2) as the hydrophobic moiety Y include, but are not limited to, a phenyl group, a biphenyl group, a naphthyl group.

As the above-defined (y3) as the hydrophobic moiety Y, examples include, but are not limited to, the aromatic hydrocarbon group of the above-defined (y2) to which the aliphatic hydrocarbon group is bound by substitution, two or more aromatic hydrocarbon groups of the above-defined (y2) in which the aromatic hydrocarbon groups are linked by the aliphatic hydrocarbon group, and combinations thereof. The aliphatic hydrocarbon group is preferably such that the total number of carbon atoms in the hydrophobic moiety Y is 1 or more and 22 or less as a whole. The aliphatic hydrocarbon group is in particular preferably a phenyl group to which the aliphatic hydrocarbon group is bound by substitution in para-positions. As the aliphatic hydrocarbon group in the above-defined (y3), one preferred as the aliphatic hydrocarbon group in the above-defined (y1) can be preferably used as well.

The above-defined (y4) as the hydrophobic moiety Y is a monovalent group that is a combination of at least one $-(C_3H_6O)_m-$(where m is 1 or more and 5 or less) and at least one selected from an aliphatic hydrocarbon group containing 4 or more and 22 or less carbon atoms and an aromatic hydrocarbon group containing 6 or more and 12 or less carbon atoms. The above-defined (y4) in particular preferably contains at least one selected from an aliphatic hydrocarbon group containing 4 or more and 22 or less carbon atoms and an aromatic hydrocarbon group containing 6 or more and 12 or less carbon atoms, in the terminal on the opposite side to the hydrophilic moiety X.

For the above-defined (y4), the total number of carbon atoms is preferably 9 or more and 40 or less, and more preferably 12 or more and 40 or less.

As the aliphatic hydrocarbon group in the above-defined (y4), those exemplified above as the aliphatic hydrocarbon group in the above-defined (y1) can be preferably used as well.

As the aromatic hydrocarbon group in the above-defined (y4), examples include those exemplified above as the above-defined (y2) as the hydrophobic moiety Y.

Preferred and specific examples of the above-defined (y4) as the hydrophobic moiety Y include a monovalent group represented by the following general formula (Y-1).

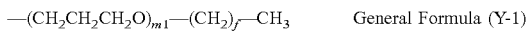

$$-(CH_2CH_2CH_2O)_{m1}-(CH_2)_f-CH_3 \quad \text{General Formula (Y-1)}$$

where m1 is an integer of 1 or more and 5 or less, and f is an integer of 3 or more and 21 or less.

In the embodiment in the present disclosure, one kind of the constitutional unit represented by the general formula (I) contained in the side-chain liquid crystal polymer may be singly used, or two or more kinds of such constitutional units may be used in combination.

(2) Liquid Crystal Constitutional Unit

In the first embodiment in the present disclosure, the liquid crystal constitutional unit contains a side chain including a liquid crystal moiety, that is, a moiety showing liquid crystal property. The liquid crystal constitutional unit is preferably a constitutional unit containing, at its side chain, a mesogen showing liquid crystal property. The liquid crystal constitutional unit is preferably a constitutional unit derived from a compound showing liquid crystal property in which a polymerizable group is bonded to a mesogen group to interpose a spacer therebetween. In the present disclosure, the mesogen denotes a moiety having a high rigidity so as to show liquid crystal property. Examples thereof include a partial structure which contains two or more cyclic structures, preferably three or more cyclic structures and which is a structure in which the cyclic structures are bonded directly to each other or the cyclic structures are bonded to each other to interpose 1 to 3 atoms therebetween. When the side chain contains such a moiety showing liquid crystal property, the constitutional unit showing the liquid crystal property is homeotropically aligned with ease.

The cyclic structures may each be an aromatic ring such as benzene, naphthalene or anthracene, or may be a cyclic aliphatic hydrocarbon such as cyclopentyl or cyclohexyl.

When the cyclic structures are bonded to each other via a linking moiety, examples of the structure of this linking moiety include —O—, —S—, —O—C(=O)—, —C(=O)—O—, —O—C(=O)—O—, —NR—C(=O)—, —C(=O)—NR—, —O—C(=O)—NR—, —NR—C(=O)—O—, —NR—C(=O)—NR—, —O—NR— and —NR—O— where Rs are each a hydrogen atom or a hydrocarbon group.

The mesogen is in particular preferably a rodlike mesogen in which, for example, benzene rings are bonded to each other at their para-positions, or naphthalene rings are bonded to each other at their 2,6-positions to make the linkage of the cyclic structures into a rod form.

When the liquid crystal constitutional unit is a constitutional unit including, at its side chain, a mesogen showing liquid crystal property, the terminal of the side chain of the constitutional unit is preferably a polar group or an alkyl group from the viewpoint of the homeotropic alignment property. Specific examples of the polar group include —F, —Cl, —CN, —OCF₃, —OCF₂H, —NCO, —NCS, —NO₂, —NHC(=O)—R', —C(=O)—OR', —OH, —SH, —CHO, —SO₃H, —NR'₂ or —OR" where R's are each a hydrogen atom or a hydrocarbon, and R"s are each an alkyl group.

In the embodiment in the present disclosure, one kind of the liquid crystal constitutional unit may be singly used, or two or more kinds of such units may be used in combination.

The liquid crystal constitutional unit is preferably a constitutional unit derived from a monomer which contains a group containing an ethylenic double bond and which is polymerizable with a monomer which serves to derive the constitutional unit represented by the general formula (I). Examples of the monomer, which contains a group containing an ethylenic double bond, include (meth)acrylic acid esters, styrene, (meth)acrylamide, maleimide, vinyl ethers, vinyl esters, and other derivatives. The liquid crystal constitutional unit is in particular preferably a constitutional unit derived from a (meth)acrylic acid ester from the viewpoint of the homeotropic alignment property.

In the embodiment in the present disclosure, the liquid crystal constitutional units preferably include a constitutional unit represented by the following general formula (II) from the viewpoint of the homeotropic alignment property:

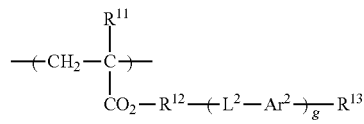

General Formula (II)

where $R^{11}$ is a hydrogen atom or a methyl group; $R^{12}$ is a group represented by $-(CH_2)_o-$ or $-(C_2H_4O)_o-$; $L^2$ is a direct bond or a linking group represented by —O—, —O—C(=O)— or —C(=O)—O—; $Ar^2$ is an arylene group containing 6 or more and 10 or less carbon atoms and optionally containing a substituent group; $L^2$ is may be the same or different from each other, and $Ar^2$s may be the same or different from each other; $R^{13}$ is —F, —Cl, —CN, —OCF$_3$, —OCF$_2$H, —NCO, —NCS, —NO$_2$, —NHC(=O)—R$^{14}$, —C(=O)—OR$^{14}$, —OH, —SH, —CHO, —SO$_3$H, —NR$^{14}{}_2$, —R$^{15}$, or —OR$^{15}$; R$^{14}$ is a hydrogen atom or an alkyl group containing 1 or more and 6 or less carbon atoms; R$^{15}$ is an alkyl group containing 1 or more and 6 or less carbon atoms; g is an integer of 2 or more and 4 or less; and o and o' are each independently an integer of 2 or more and 10 or less.

In R$^{12}$, o and o' are each independently an integer of 2 or more and 10 or less. From the viewpoint of the homeotropic alignment property, o and o' are in particular preferably 2 or more and 8 or less, and more preferably 2 or more and 6 or less.

Examples of the arylene group containing 6 or more and 10 or less carbon atoms and optionally containing a substituent in Ar$^2$ include phenylene and naphthylene groups. Out of these groups, a phenylene group is more preferred. Examples of the substituent which the arylene group may contain, besides R$^{13}$, include alkyl groups containing 1 or more and 5 or less carbon atoms, and halogen atoms such as fluorine, chlorine and bromine atoms.

In R$^{13}$, R$^{14}$ is a hydrogen atom, or an alkyl group containing 1 or more and 6 or less carbon atoms. R$^{14}$ is in particular preferably a hydrogen atom, or an alkyl group containing 1 or more and 3 or less carbon atoms. In R$^{13}$, R$^{15}$ is an alkyl group containing 1 or more and 6 or less carbon atoms. R$^{15}$ is in particular preferably an alkyl group containing 1 or more and 5 or less carbon atoms.

Preferred and specific examples of the liquid crystal constitutional unit represented by the general formula (II) include constitutional units represented by the following chemical formulae (II-1), (II-2), and (II-3), respectively. However, the liquid crystal constitutional unit is not limited to these examples.

In the embodiment in the present disclosure, the side-chain liquid crystal polymer may be a block copolymer containing block moieties made of the constitutional units represented by the general formula (I), and block moieties made of liquid crystal constitutional units; or may be a random copolymer in which the constitutional units represented by the general formula (I) and liquid crystal constitutional units are irregularly arranged. In the present embodiment, the random copolymer is preferred in order to improve the polymerizable liquid crystal compound in homeotropic alignment property and in-plane uniformity of retardation value and to form the retardation layer which is not easily broken.

In the side-chain liquid crystal polymer, the content rate of the constitutional units represented by the general formula (I) is not particularly limited. From the viewpoint of the homeotropic alignment property and heat resistance, the content rate in the whole constitutional units (100% by mole) is preferably 20% by mole or more and 80% by mole or less. From the viewpoint of increasing heat resistance, the content rate is preferably 25% by mole or more, more preferably 30% by mole or more, and even more preferably 35% by mole or more. Meanwhile, from the viewpoint of a sufficient amount of the liquid crystal constitutional unit contained and easy purification during polymerization, the content rate of the constitutional unit represented by the general formula (I) is in particular preferably 60% by mole or less, more preferably 50% by mole or less, and even more preferably 45% by mole or less.

Also in the side-chain liquid crystal polymer, from the viewpoint of the homeotropic alignment property and heat resistance, the content rate of the liquid crystal constitutional unit in the whole constitutional units (100% by mole) is preferably 80% by mole or less, more preferably 75% by mole or less, even more preferably 70% by mole or less, and particularly preferably 65% by mole or less. On the other Chemical Formula (II-1)

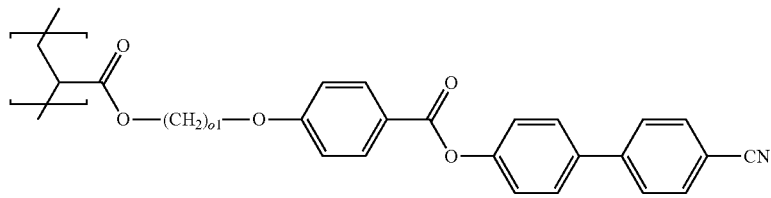

In the above formula, o1 is an integer of 2 or more and 6 or less.

Chemical Formula (II-2)

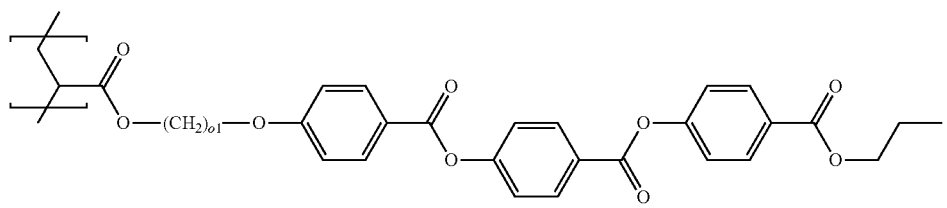

In the above formula, o2 is an integer of 2 or more and 6 or less.

Chemical Formula (II-3)

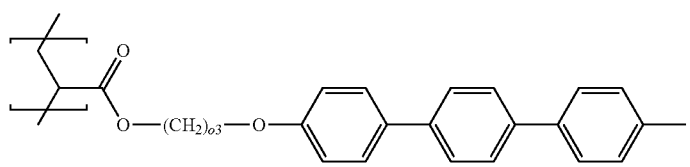

In the above formula, o3 is an integer of 2 or more and 6 or less.

hand, the content rate is preferably 20% by mole or more, more preferably 40% by mole or more, even more preferably 50% by mole or more, and particularly preferably 55% by mole or more.

The content rate of the constitutional units in the copolymer can be calculated from integral values obtained by $^1$H-NMR measurement.

(3) Different Constitutional Unit

In the embodiment in the present disclosure, the side-chain liquid crystal polymer may contain, besides the constitutional units represented by the general formula (I) and the liquid crystal constitutional unit, a different constitutional unit which falls under neither any constitutional unit represented by the general formula (I) nor the liquid crystal constitutional unit, as far as the advantageous effects of the present embodiment are not impaired. When the side-chain liquid crystal polymer contains the different constitutional unit, the polymer can be heightened in, for example, solvent solubility, heat resistance, and reactivity.

One kind of the different constitutional unit may be singly used, or two or more kinds of such units may be used in combination. The content rate of the different constitutional unit is preferably in a range of 0% or more and 30% or less, and more preferably in a range of 0% or more and 20% or less by mole in the whole of the constitutional units (100% by mole) of the side-chain liquid crystal polymer. If the content rate of the different constitutional unit exceeds the upper limit value, the content rate of the liquid crystal constitutional unit and the constitutional units represented by the general formula (I) becomes relatively small, so that the advantageous effects of the present invention may be difficult to obtain.

In the embodiment in the present disclosure, the mass-average molecular weight Mw of the side-chain liquid crystal polymer is not particularly limited, and is preferably in a range of 500 or more and 60000 or less, more preferably in a range of 3000 or more and 50000 or less, and even more preferably in a range of 5000 or more and 40000 or less. When the mass-average molecular weight is in any one of the ranges, the resultant liquid crystal composition is excellent in stability, and the composition is excellent in handleability when made into a retardation layer.

The mass-average molecular weight Mw is a value measured by GPC (gel permeation chromatography). The measurement is made, using an instrument HLC-8120GPC manufactured by Tosoh Corp., and using tetrahydrofuran as an eluting solvent; using polymers of Mw 1110000, 397000, 98900, 13700, 5430, 1010 and Mw 707000, 189000, 37200, 9490 and 2500 (all manufactured by Tosoh Corp.) as polystyrene standards for calibration curves; and two columns TSK-GEL ALPHA-M (manufactured by Tosoh Corp.) as measuring columns.

One kind of the side-chain liquid crystal polymer may be singly used, or two or more kinds of such polymers may be used in combination. In the present embodiment, the content rate of the side-chain liquid crystal polymer is preferably 1 part by mass or more, more preferably 3 parts by mass or more, and even more preferably 5 parts by mass or more for 100 parts by mass of solid components in the liquid crystal composition, from the viewpoint of the homeotropic alignment property and heat resistance of the retardation layer. On the other hand, the content rate of the side-chain liquid crystal polymer is preferably 30 parts by mass or less, and more preferably 25 parts by mass or less for 100 parts by mass of solid components in the liquid crystal composition, since, due to the sufficient content of the polymerizable liquid crystal compound, the endurance properties such as heat resistance of the retardation layer can be improved.

In the present disclosure, solid components denote all components from which any solvent is removed. Examples thereof include the polymerizable liquid crystal compound, which will be detailed below, even when this compound is in a liquid form.

Also in the present embodiment, from the viewpoint of improving the homeotropic alignment property and heat resistance, the mass ratio of the side-chain liquid crystal polymer is preferably 1% by mass or more, more preferably 3% by mass or more, and even more preferably 5% by mass or more, with respect to the total mass of the side-chain liquid crystal polymer and the polymerizable liquid crystal compound described below. On the other hand, from the point of view that the endurance properties such as heat resistance can be improved by containing a sufficient amount of the polymerizable liquid crystal compound, the mass ratio of the side-chain liquid crystal polymer is preferably 30% by mass or less, more preferably 25% by mass or less, even more preferably 20% by mass or less.

(4) Production of Side-Chain Liquid Crystal Polymer

In the present embodiment, the method for producing the side-chain liquid crystal polymer is not particularly limited. For example, the side-chain liquid crystal polymer may be produced by mixing a monomer for deriving the constitutional unit represented by the general formula (I) and a monomer for deriving the liquid crystal constitutional unit at a desired ratio and polymerizing them by a known polymerization means to give a desired average molecular weight.

In the case of producing a block copolymer, for example, after the monomer for deriving the constitutional unit represented by the general formula (I) and the monomer for deriving the liquid crystal constitutional unit are polymerized by a known polymerization means, the resultant polymers may be linked, or after any one of the monomer for deriving the constitutional unit represented by the general formula (I) and the monomer for deriving the liquid crystal constitutional unit is polymerized by a known polymerization means, the resultant is mixed with the other monomer and further polymerized.

As the polymerization means, a method generally used for polymerization of a compound containing vinyl group, may be used. For example, anionic polymerization or living radical polymerization may be used. In the present embodiment, a method in which living polymerization proceeds, such as the group transfer polymeriazation (GTP) as disclosed in "J. Am. Chem. Soc." 105, 5706(1983), is in particular preferably used. Since the molecular weight, molecular weight distribution and so on can be easily controlled in desired ranges by this method, the characteristics of the resultant side-chain liquid crystal polymer can be uniform.

In the present disclosure, the structure of the side-chain liquid crystal polymer can be analyzed by a combination of nuclear magnetic resonance spectroscopy (NMR) and at least any one of pyrolysis-gas chromatography-mass spectrometry (Py-GC-MS) and matrix-assisted laser desorption/ionization time-of-flight mass spectrometry (MALDI-TOFMS).

In the liquid crystal composition in the second embodiment in the present disclosure, the side-chain liquid crystal polymer contains the constitutional unit which is represented by the general formula (I') and the liquid crystal constitutional unit, and the side-chain liquid crystal polymer can show the homeotropic alignment property. The constitutional unit represented by the general formula (I') is a constitutional unit not including, at its side chain, a liquid crystal moiety. The liquid crystal moiety is as described above and is typically a mesogen.

In the general formula (I'), X' as the hydrophilic moiety is a divalent group wherein a specific cardinal number of an atomic group by the Davies method, is 0.5 or more and 5.7 or less, and Y' as the hydrophobic moiety is a monovalent group wherein a specific cardinal number of an atomic group by the Davies method, is −10.5 or more and −3.0 or less. The cardinal number of the hydrophilic moiety X' is preferably 0.6 or more and 5.3 or less, and more preferably 0.65 or more and 3.0 or less. The cardinal number of the hydrophobic moiety Y' is preferably −9.0 or more and −3.4 or less, and more preferably −8.0 or more and −4.0 or less.

As used herein, the specific cardinal number of an atomic group by the Davies method is described in, for example, Takehiko Fujimoto, "The Handbook of surfactants", Sanyo Chemical Industries, Ltd., 2007, Section II, Chapter 6 (The relationship between the chemical structure and physical properties of surfactants) and J. T. Davies and E. K. Rideal, "Interfacial Phenomena", Academic Press, New York, 1963, P. 371-383. In particular, the cardinal number of —(CH$_2$CH$_2$O)— is 0.33; the cardinal number of —(CH$_2$CH$_2$CH$_2$O)— is −0.125; the cardinal number of —(CH(CH$_3$)CH$_2$O)— is −0.15; the cardinal number of —(CH$_2$CH(CH$_3$)O)— is −0.15; the cardinal number of —OH is 1.9; the cardinal number of —O— is 1.3; the cardinal number of —CH$_2$— is −0.475; the cardinal number of CH$_3$— is −0.475; the cardinal number of =CH— is −0.475; and the cardinal number of —O—C(=O)— is 2.4. As the divalent group wherein the specific cardinal number of an atomic group by the Davies method, is 0.5 or more and 5.7 or less, examples include those exemplified above as the hydrophilic moiety X in the general formula (I). As the monovalent group wherein the specific cardinal number of an atomic group by the Davies method, is −10.5 or more and −3.0 or less, examples include those exemplified above as the hydrophobic moiety Y in the general formula (I).

In the liquid crystal composition in the second embodiment in the present disclosure, the liquid crystal constitutional unit, different constitutional unit, and mass average molecular weight Mw of the side-chain liquid crystal polymer may be the same as the first embodiment.

In the side-chain liquid crystal polymer used in the second embodiment in the present disclosure, the content rate of the liquid crystal constitutional unit, the content rate of the constitutional unit represented by the general formula (I'), and the content rate of the different constitutional unit may be the same as the content rate of the liquid crystal constitutional unit, the content rate of the constitutional unit represented by the general formula (I), and the content rate of the different constitutional unit in the side-chain liquid crystal polymer used in the first embodiment, respectively.

The content rate of the side-chain liquid crystal polymer in the solid content of the liquid crystal composition in the second embodiment in the present disclosure, may be the same as the first embodiment.

The side-chain liquid crystal polymer used in the second embodiment may be produced by the same method as the first embodiment.

<Polymerizable Liquid Crystal Compound>

In one embodiment in the present disclosure, the polymerizable liquid crystal compound may be appropriately selected from polymerizable liquid crystal compounds known in the prior art. In the present embodiment, the polymerizable liquid crystal compound is preferably a polymerizable liquid crystal compound containing a polymerizable group at least in one terminal of its mesogen, and is more preferably a polymerizable liquid crystal compound containing polymerizable groups in both terminals of its mesogen respectively, from the viewpoint of the homeotropic alignment property and the durability of the resultant retardation layer in a combination of the side-chain liquid crystal polymer with the compound.

The mesogen, which the polymerizable liquid crystal compound contains, may be the same mesogen that the liquid crystal constitutional unit contains in the above-mentioned side-chain liquid crystal polymer.

As the polymerizable group which the polymerizable liquid crystal compound contains, examples include cyclic-ether-containing groups, such as an oxirane ring and an oxetane ring, and ethylenic-double-bond-containing groups. Out of these examples, ethylenic-double-bond-containing groups are preferred since the liquid crystal compound shows light curability and are excellent in handleability. Examples of the ethylenic-double-bond-containing groups include vinyl, allyl and (meth)acryloyl groups. Out of these examples, a (meth)acryloyl group is preferred.

In the present embodiment, the polymerizable liquid crystal compound is preferably one or more compounds selected from compounds each represented by the following general formula (III) and compounds each represented by the following general formula (IV) from the viewpoint of the homeotropic alignment property:

General Formula (III)

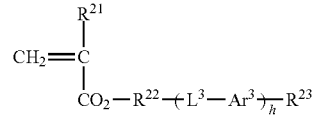

where $R^{21}$ represents a hydrogen atom or a methyl group; $R^{22}$ represents a group represented by —(CH$_2$)$_p$— or —(C$_2$H$_4$O)$_{p'}$—; $L^3$ represents a direct bond or a linking group represented by —O—, —O—C(=O)— or —C(=O)—O—; $Ar^3$ represents an arylene group containing 6 or more and 10 or less carbon atoms and optionally containing a substituent; plural $L^3$s, as well as plural $Ar^3$s, may be the same or different from each other; $R^{23}$ represents —F, —Cl, —CN, —OCF$_3$, —OCF$_2$H, —NCO, —NCS, —NO$_2$, —NHC(=O)—R$^{24}$, —C(=O)—OR$^{24}$, —OH, —SH, —CHO, —SO$_3$H, —NR$^{14}$$_2$, —R$^{25}$ or —OR$^{25}$; $R^{14}$ represents a hydrogen atom, or an alkyl group containing 1 or more and 6 or less carbon atoms; $R^{25}$ represents an alkyl group containing 1 or more and 6 or less carbon atoms; h is an integer of 2 or more and 4 or less; and p and p' are each independently an integer of 2 or more and 10 or less.

General Formula (IV)

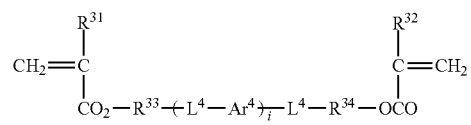

where $R^{31}$ and $R^{32}$ each independently represent a hydrogen atom or a methyl group; $R^{33}$ represents a group represented by —(CH$_2$)$_q$— or —(C$_2$H$_4$O)$_{q'}$—; $R^{34}$ represents a group represented by —(CH$_2$)$_r$— or —(OC$_2$H$_4$)$_{r'}$—; $L^4$ represents a direct bond or a linking group represented by —O—, —O—C(=O)— or —C(=O)—O—; $Ar^4$ represents an arylene group containing 6 or more and 10 or less carbon atoms and optionally containing a substituent; plural $L^4$s, as well as $Ar^4$s, may be the same or different from each other;

i is an integer of 2 or more and 4 or less; and q, q', r and r' are each independently an integer of 2 or more and 10 or less.

Also, p and p' in the general formula (III) and q, q', r and r' in the general formula (IV) are each preferably 2 or more and 8 or less, more preferably 2 or more and 6 or less, and even more preferably 2 or more and 5 or less from the viewpoint of the homeotropic alignment property.

$L^3$ and $L^4$ may each be any one of the same groups as for $L^2$ in the general formula (II).

$Ar^3$ and $Ar^4$ may each be any one of the same groups as for $Ar^2$ in the general formula (II).

The mesogen structure contained in the polymerizable liquid crystal compound is preferably a partial structure represented by each of chemical formulae (V-1) to (V-4) illustrated below, and is in particular preferably a partial structure represented by at least one selected from the group consisting of the chemical formulae (V-1), (V-2) and (V-4) each containing three or more cyclic structures. Any hydrogen atom in a phenylene group or naphthylene group in the partial structure represented by each of the chemical formulae (V-1) to (V-4) may be substituted by an alkyl group containing 1 or more and 3 or less carbon atoms, or a halogen atom.

(V-1)

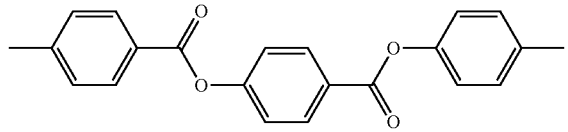
(V-2)

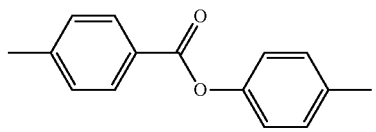
(V-3)

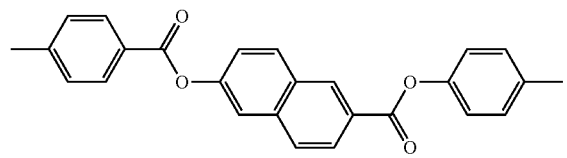
(V-4)

Preferred and specific examples of the compound represented by the general formula (III) and the compound represented by the general formula (IV) include compounds represented by chemical formulae (1) to (17) illustrated below. However, the compounds are not limited to these examples.

(1)

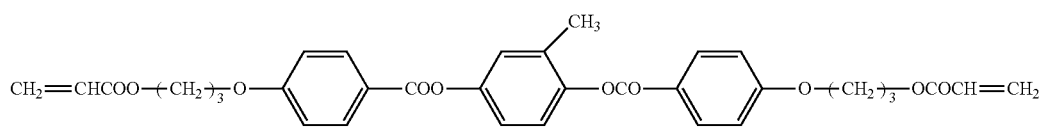

(2)

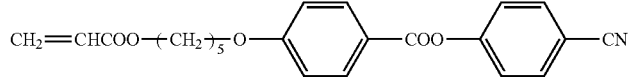

(3)

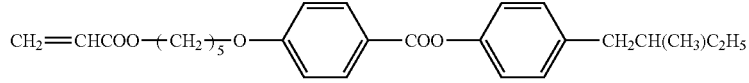

(4)

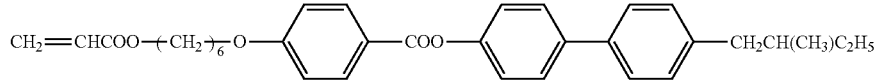

(5)

(6)

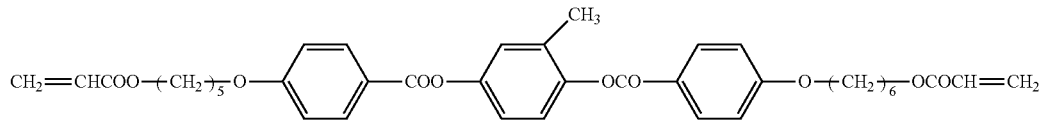

(7)

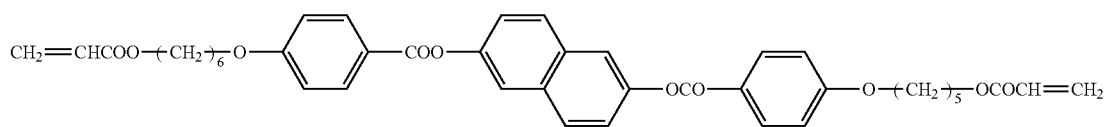

-continued

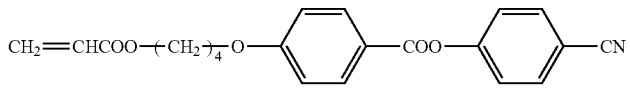
(8)

(9)

(10)

(11)

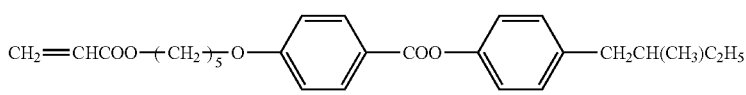
(12)

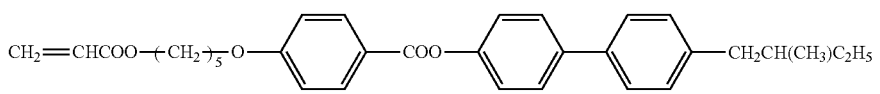
(13)

(14)

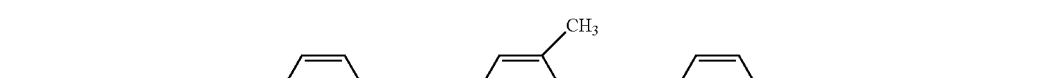
(15)

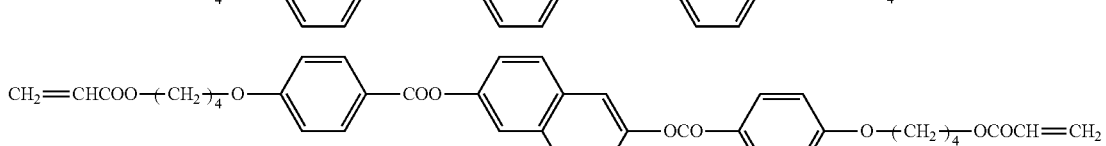
(16)

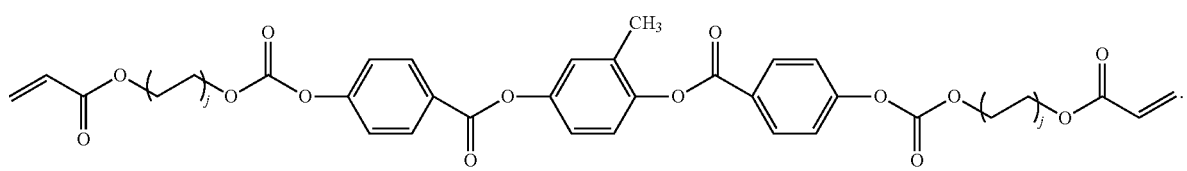
(17)

In the above formulae, j is and interger of 2 or more and 5 or less

In the present embodiment, one kind of the polymerizable liquid crystal compound may be singly used, or two or more kinds of such compounds may be used in combination.

In the present embodiment, the content rate of the polymerizable liquid crystal compound is preferably 20 parts by mass or more, more preferably 30 parts by mass or more, and even more preferably 40 parts by mass or more for 100 parts by mass of solid components in the liquid crystal composition to improve the endurance properties such as heat resistance of the resultant retardation layer. In the liquid crystal composition of the present disclosure, since the content rate of the side-chain liquid crystal polymer can be small, the content rate of the polymerizable liquid crystal compound can be 70 parts by mass or more. In a more preferred embodiment, the content rate can be 75 parts by mass or more. On the other hand, the content rate of the polymerizable liquid crystal compound is preferably 99 parts by mass or less, more preferably 97 parts by mass or less, and even more preferably 95 parts by mass or less, from the viewpoint of containing a sufficient amount of the side-chain liquid crystal polymer and increasing the homeotropic alignment property and heat resistance.

<Photopolymerization Initiator>

In the present embodiment, the photopolymerization initiator may be appropriately selected from photopolymerization initiators known in the prior art. Specific and preferred examples of the photopolymerization initiator include aromatic ketones including thioxanthone, α-aminoalkylphenones, α-hydroxyketones, acylphosphine oxides, oxime esters, aromatic onium salts, organic peroxides, thio compounds, hexaaryl biimidazole compounds, ketoxime ester compounds, borate compounds, azinium compounds, metallocene compounds, active ester compounds, compounds each containing a carbon-halogen bond, and alkylamine compounds. Out of these examples, at least one from the following is preferred: acylphosphine oxide-based polymerization initiators, α-aminoalkylphenone-based polymerization initiators, α-hydroxyketone-based polymerization initiators, and oxime ester-based polymerization initiators.

Examples of the acylphosphine oxide-based polymerization initiators include bis(2,4,6-trimethylbenzoyl)-phenylphosphine oxide (for example, trade name: IRGACURE 819, manufactured by BASF Corp.), bis(2,6-dimethoxybenzoyl)-2,4,4-trimethyl-pentylphenylphosphine oxide, and 2,4,6-trimethylbenzoyl-diphenyl-phosphine oxide (trade name: LUCIRIN TPO, manufactured by BASF Corp., and others).

Examples of the α-aminoalkylphenone-based polymerization initiators include 2-methyl-1-(4-methylthiophenyl)-2-morpholinopropane-1-one (for example, IRGACURE 907, manufactured by BASF Corp.), 2-benzyl-2-(dimethylamino)-1-(4-morpholinophenyl)-1-butanone (for example, IRGACURE 369, manufactured by BASF Corp.), and 2-(dimethylamino)-2-[(4-methylphenyl)methyl]-1-[4-(4-morpholinyl)phenyl]-1-butanone (IRGACURE 379EG, manufactured by BASF Corp.)

Examples of the α-hydroxyketone-based polymerization initiators include 2-hydroxy-1-{4-[4-(2-hydroxy-2-methyl-propionyl)-benzyl]-phenyl}-2-methyl-propane-1-one (for example, trade name: IRGACURE 127, manufactured by BASF Corp., and others), 2-hydroxy-4'-hydroxyethoxy-2-methyl propiophenone (for example, trade name: IRGACURE 2959, manufactured by BASF Corp., and others), 1-hydroxy-cyclohexyl-phenyl-ketone (for example, trade name: IRGACURE 184, manufactured by BASF Corp., and others), and oligo{2-hydroxy-2-methyl-1-[4-(1-methylvinyl)phenyl]propanone} (for example, trade name: ESACURE ONE, manufactured by Lamberti Inc., and others).

Examples of the oxime ester-based polymerization initiators include 1,2-octanedione, 1-[4-(phenylthio)-, 2-(O-benzoyloxime)] (trade name: IRGACURE OXE-01, manufactured by BASF Corp.), ethanone,1-[9-ethyl-6-(2-methylbenzoyl)-9H-carbazol-3-yl]-,1-(o-acetyloxime) (trade name: IRGACURE OXE-02, manufactured by BASF Corp.), methanone,ethanone,1-[9-ethyl-6-(1,3-dioxolane,4-(2-methoxyphenoxy)-9H-carbazol-3-yl]-,1-(o-acetyloxime) (trade name: ADEKA OPT-N-1919, manufactured by Adeka Corp.)

In the present embodiment, one kind of the photopolymerization initiator may be singly used, or two or more kinds of such initiators may be used in combination.

In the present embodiment, to promote the curing of the polymerizable liquid crystal compound, the content rate of the photopolymerization initiator is preferably 0.1 parts by mass or more and 10 parts by mass or less, and more preferably 1 part by mass or more and 8 parts by mass or less, for 100 parts by mass of solid components in the liquid crystal composition.

<Other Components>

The liquid crystal composition of the present embodiment may include any other component as far as the advantageous effects thereof are not impaired. Specifically, the composition may include, as the other component, for example, a leveling agent, a polymerization inhibitor, an antioxidant or a light stabilizer, or a solvent from the viewpoint of the coatability of the composition. These components may each be any selected appropriately from materials known in the prior art.

The leveling agent is preferably a fluorine type or a silicone type leveling agent. Specific examples of the leveling agent include MEGAFACE series manufactured by DIC Corp. and described in JP 2010-122325A, TSF series manufactured by Momentive Performance Materials Japan Inc., and FTERGENT series manufactured by Neos Co., Ltd. When the leveling agent is used in the present embodiment, the content rate thereof is preferably set to an amount of 0.001 parts by mass or more and 5 parts by mass or less for 100 parts by mass of solid components in the liquid crystal composition.

The liquid crystal composition of the present embodiment optionally includes a solvent from the viewpoint of the coatability thereof. The solvent is sufficient to be selected appropriately from solvents known in the prior art in each of which the individual components included in the liquid crystal composition can be dissolved or dispersed. Specific examples thereof include hexane, cyclohexane, and other hydrocarbon solvents; methyl ethyl ketone, methyl isobutyl ketone, cyclohexanone, and other ketone solvents; tetrahydrofuran, propylene glycol monoethyl ether (PGME), and other ether solvents; chloroform, dichloromethane, and other halogenated alkyl solvents; ethyl acetate, propylene glycol monomethyl ether acetate, and other ester solvents; N, N-dimethylformamide, and other amide solvents; dimethylsulfoxide, and other sulfoxide solvents; and methanol, ethanol, propanol, and other alcohol solvents. In the present embodiment, one kind of the solvent may be singly used, or two or more kinds of such solvents may be used in combination.

The liquid crystal composition of the present embodiment is suitable for producing a positive C type retardation layer, since the side-chain liquid crystal polymer is homeotropically aligned with ease, and the polymerizable liquid crystal compound is homeotropically aligned with ease, accordingly.

B. Retardation Film

The retardation film in the first embodiment in the present disclosure is a retardation film containing a retardation layer, wherein the retardation layer contains a cured product of a liquid crystal composition containing a side-chain liquid crystal polymer and a polymerizable liquid crystal compound, and wherein the side-chain liquid crystal polymer contains a constitutional unit which is represented by the general formula (I) and a liquid crystal constitutional unit which contains a side chain including a liquid crystal moiety.

The retardation film in the second embodiment in the present disclosure is a retardation film containing a retardation layer, wherein the retardation layer contains a cured product of a liquid crystal composition containing a side-chain liquid crystal polymer and a polymerizable liquid crystal compound, and wherein the side-chain liquid crystal polymer contains a constitutional unit which is represented by the general formula (I') and a liquid crystal constitutional unit which contains a side chain including a liquid crystal moiety.

In the retardation film of the present disclosure, since the retardation layer contains the cured product of the liquid crystal composition, the retardation layer has excellent homeotropic alignment property and improved heat resistance. The retardation layer containing the cured product of the liquid crystal composition in the present disclosure, is typically made of the cured product of the liquid crystal composition in the present disclosure, and the retardation layer may include any other constituent as far as the advantageous effects of the present disclosure are not impaired.

Figure 2:
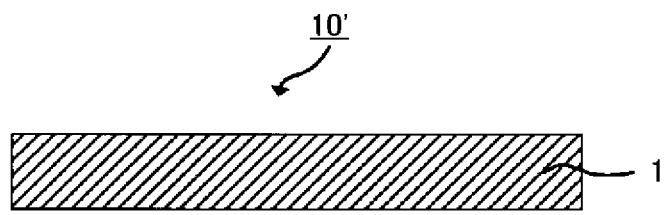
FIG. 2 is a schematic sectional view showing an embodiment of a retardation film.
Figure 3:
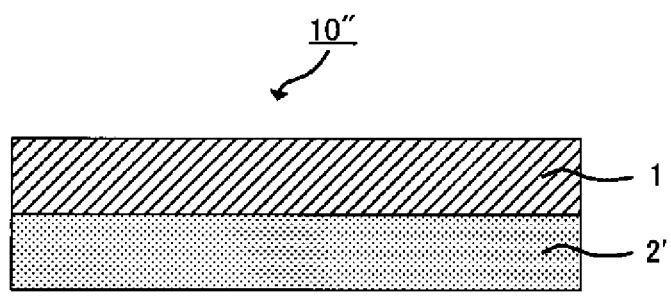
FIG. 3 is a schematic sectional view showing an embodiment of a retardation film.

With reference to the drawings, the layer structure of the retardation film will be described. FIGS. 1 to 3 each show one embodiment of the retardation film in the present disclosure. The one embodiment illustrated in FIG. 1, which is a retardation film 10, is a retardation film in which an alignment membrane 3 and a retardation layer 1 are laminated in this order on a substrate 2. The one embodiment illustrated in FIG. 2, which is a retardation film 10', is a retardation film made only of a retardation layer 1. In the one embodiment illustrated in FIG. 3, which is a retardation film 10", a retardation layer 1 is directly formed on a substrate 2'. In the retardation film 10" illustrated in FIG. 3, a means for expressing alignment-regulating force may be given to a retardation-layer-1-side surface of the substrate 2'.

As described above, in the liquid crystal composition, which contains a side-chain liquid crystal polymer containing constitutional units represented by the general formula (I) or (I') and a liquid crystal constitutional unit, and further contains a polymerizable liquid crystal compound, the side-chain liquid crystal polymer is homeotropically aligned with ease, and the polymerizable liquid crystal compound is homeotropically aligned with ease, accordingly. Thus, even when no alignment membrane is used, the retardation layer can show homeotropic alignment property.

1. Retardation Layer

The retardation layer 1 of an embodiment in the present disclosure contains a cured product of a liquid crystal composition containing a side-chain liquid crystal polymer and a polymerizable liquid crystal compound, and the side-chain liquid crystal polymer contains a constitutional unit which is represented by the general formula (I) or (I') and a liquid crystal constitutional unit which contains a side chain including a liquid crystal moiety.

The side-chain liquid crystal polymer which contains the constitutional unit which is represented by the general formula (I) or (I') and the liquid crystal constitutional unit, and the polymerizable liquid crystal compound may each be the same as described about the liquid crystal composition of the embodiment in the present disclosure. Thus, any description thereabout is omitted herein.

The retardation layer is preferably a retardation layer in which the liquid crystal constitutional unit of the side-chain liquid crystal polymer, and the polymerizable liquid crystal compound are cured in the state of being homeotropically aligned. The cured product of the liquid crystal composition of the embodiment in the present disclosure contains a structure yielded by polymerizing polymerizable groups of the polymerizable liquid crystal compound at least partially. Since the cured product contains this structure, which is yielded by polymerizing the polymerizable groups of the polymerizable liquid crystal compound at least partially, the retardation layer of the present embodiment is a retardation layer improved in durability.

The liquid crystal constitutional unit included in the retardation layer can be identified by one or more methods out of known methods by which molecular structure information pieces can be gained, such as a nuclear magnetic resonance method (NMR), infrared spectroscopy (IR), gas chromatogram mass spectroscopy (GC-MS), X-ray photoelectron spectroscopy (XPS), and time-of-flight secondary ion mass spectroscopy (TOF-SIMS).

Moreover, it can be verified that the polymerizable liquid crystal compound is homeotropically aligned by measuring the retardation thereof, using an automatically birefringence measuring instrument (for example, trade name: KOBRA-WR, manufactured by Oji Scientific Instruments Co., Ltd.)

The retardation can be measured, using an automatically birefringence measuring instrument (for example, trade name: KOBRA-WR, manufactured by Oji Scientific Instruments Co., Ltd.) Measuring-light is radiated into the retardation layer perpendicularly or obliquely to a surface of this layer. From a chart of the optical retardation of the retardation layer and the incident angle of the measuring-light, verification can be attained about the anisotropy of increasing the retardation of the retardation layer.

For the retardation layer in the embodiment in the present disclosure, from the viewpoint of the homeotropic alignment property, the thickness direction retardation Rth (550) at a measuring wavelength of 550 nm is preferably less than −80 nm, more preferably less than −100 nm, and even more preferably less than −110 nm.

The retardation of the retardation layer can be measured by transferring the retardation layer onto a stickiness layer-attached glass plate. The thickness direction retardation Rth of the retardation layer can be represented by Rth [nm]={(nx+ny)/2−nz}×d (where nx is the refractive index in the slow axis direction in the in-plane direction of the retardation layer (the direction in which the refractive index in the in-plane direction of the retardation layer is the maximum); ny is the refractive index in the fast axis direction in the in-plane direction of the retardation layer (the direction in which the refractive index in the in-plane direction of the retardation layer is the minimum); nz is the thickness direction refractive index of the retardation layer; and d is the thickness of the retardation layer).

For the retardation layer in the embodiment in the present disclosure, the retardation change rate when heated at 100° C. for 60 minutes can be 14% or less. In a more preferred embodiment, the retardation change rate can be 10% or less. The retardation change rate can be calculated by the following formula:

Retardation change rate (%) after heating={(Rth before heating−Rth after heating)/Rth before heating}×100

In the above formula, Rth is the thickness direction retardation Rth (550) at a measuring wavelength of 550 nm.

By collecting a material from the retardation layer, and then analyzing the material, it can be verified that the retardation layer includes the side-chain liquid crystal polymer included in the liquid crystal composition of the embodiment in the present disclosure, and the structure yielded by polymerizing the polymerizable groups of the polymerizable liquid crystal compound at least partially. A method for the analysis can make use of NMR, IR, GC-MS, XPS and TOF-SIMS, and a combination of two or more of these methods.

The retardation layer may include a photopolymerization initiator, a leveling agent, a polymerization inhibitor, an antioxidant, a light stabilizer, and other components. The retardation layer may not include the photopolymerization initiator, or some other component that may be wholly decomposed when light radiation is performed to cause a reaction of the polymerizable groups of the polymerizable liquid crystal compound.

The thickness of the retardation layer may be appropriately set in accordance with the use purpose thereof. In particular, the thickness is preferably in a range of 0.1 μm or more and 5 μm or less, more preferably in a range of 0.5 μm or more and 3 μm or less, and even more preferably in a range of 0.7 μm or more and 1.5 μm or less, from the viewpoint of controlling the thickness direction retardation to a desired value with ease.

2. Alignment Membrane

The retardation film in the present disclosure may contain an alignment membrane. In the present document DESCRIPTION, the alignment membrane is a layer for arranging a liquid crystal component included in a retardation layer into a predetermined direction.

The alignment membrane used in the embodiment in the present disclosure is preferably a homeotropic alignment membrane since the liquid crystal composition of the embodiment in the present disclosure is homeotropically aligned with ease.

The homeotropic alignment membrane is an alignment membrane having a function of aligning the long axis of a mesogen of the liquid crystal component included in the retardation layer homeotropically by laying this membrane as a coating membrane.

The homeotropic alignment membrane is an alignment membrane having alignment-regulating force in the perpendicular direction to the membrane, and may be any one of various homeotropic alignment membranes each supplied to produce a C plate, and various homeotropic alignment membranes which are each applied to a VA liquid crystal display device and other devices. The homeotropic alignment membrane may be for example, a polyimide alignment membrane, or an alignment membrane based on an LB membrane. Specific examples of a constituting material of the alignment membrane include lectin; silane surfactants; titanate surfactants; pyridinium salt polymeric surfactants; silane coupling type compositions for homeotropic alignment membranes, containing, for example, n-octadecyltriethoxysilane; and polyimide type compositions for homeotropic alignment membranes, containing, for example, a soluble polyimide containing, at its side chains, long-chain alkyl groups or alicyclic structures, or a polyamic acid containing, at its side chains, long-chain alkyl groups or alicyclic structures. Incidentally, it is allowable to use, as a composition for homeotropic alignment membranes, a commercially available product, such as a polyimide composition for homeotropic alignment membranes, "JALS-2021", or "JALS-204" manufactured by JSR Corp.; or a product "RN-1517", "SE-1211" or "EXPOA-018" manufactured by Nissan Chemical Corp. The homeotropic alignment membrane may also be a homeotropic alignment membrane described in JP 2015-191143 A.

The method for forming the alignment membrane is not particularly limited. The alignment membrane can be formed, for example, by applying a composition for alignment membranes onto a substrate that will be detailed later, and giving alignment-regulating force thereto. The means for giving alignment-regulating force to the alignment membrane may be any means known in the prior art.

The thickness of the alignment membrane is not particularly limited, as long as the alignment membrane makes it possible to arrange a liquid crystal component in the retardation layer in a predetermined direction, and may be appropriately set. The thickness of the alignment membrane is usually in a range of 1 nm or more and 10 μm or less, and preferably in a range of 60 nm or more and 5 μm or less.

3. Substrate

The retardation film in the present disclosure may contain a substrate as the support. In the present embodiment, examples of the substrate include a glass substrate, a metallic substrate, and a resin substrate. In particular, the substrate preferably has transparency, and is appropriately selectable from transparent substrates known in the prior art. The transparent substrate may be, besides the glass substrate, a transparent resin substrate formed, using a resin such as an acetylcellulose resin such as triacetylcellulose, a polyester resin such as polyethylene terephthalate, polyethylene naphthalate, polybutylene terephthalate or polylactic acid, an olefin-based resin such as polypropylene, polyethylene or polymethylpentene, acrylic resin, polyurethane resin, polyethersulfone, polycarbonate, polysulfone, polyether, polyetherketone, acrylonitrile, methacrylonitrile, cycloolefin polymer, or cycloolefin copolymer.

The transmittance of the transparent substrate is preferably 80% or more, and more preferably 90% or more in a visible ray band. The transmittance of the transparent substrate is measurable in accordance with JIS K7361-1 (Test Method for Total Light Transmittance of Plastic-Transparent Material).

When the retardation layer is formed in a roll-to-roll manner, the transparent substrate is preferably made of a flexible material having a flexibility permitting the substrate to be wound into a roll form.

Examples of the flexible material include cellulose derivatives, norbornene-based polymers, cycloolefin polymers, polymethyl methacrylate, polyvinyl alcohol, polyimide, polyarylate, polyethylene terephthalate, polysulfone, polyethersulfone, amorphous polyolefin, modified acrylic polymers, polystyrene, epoxy resins, polycarbonate, and polyesters. It is in particular preferred in the present embodiment to use a cellulose derivative or polyethylene terephthalate. This is because cellulose derivatives are especially excellent in optical isotropy, so that the substrate can be made excellent in optical properties. Moreover, polyethylene terephthalate is high in transparency and excellent in mechanical properties to be preferred.

The thickness of the substrate used in the present embodiment is not particularly limited, as far as the thickness is in a range making it possible to give a required self-supporting performance to the substrate in accordance with the use purpose of the retardation film, and other factors. The thickness is usually in a range of about 10 μm or more and 200 μm or less. In particular, the thickness of the substrate is preferably in a range of 25 μm or more and 125 μm or less, and especially preferably in a range of 30 μm or more and 100 μm or less. If the thickness is larger than in the former range, the following may be caused, for example, at the time of forming a long retardation film and subsequently cutting the film to be made into retardation film pieces: erosion products are increased or the cutting edge is worn away earlier than usual.

The structure of the substrate used in the present embodiment is not limited to a structure made of a single layer. Thus, the structure may be a structure composed of layers laminated onto each other. When the substrate has the structure composed of layers laminated onto each other, the layers which are layers having the same composition, or layers having compositions different from each other may be laminated.

For example, when the homeotropic alignment membrane cannot be disposed on the substrate, a surface control layer is preferably disposed on the surface of the substrate, the surface control layer containing, on its surface, at least one polar group selected from the group consisting of an ether bond, a hydroxyl group, an amino group, a cyano group, a carboxy group, a carbonyl group, a group containing a fluorine atom, a group containing a sulfur atom, a group containing a lactone skeleton, and a group containing an acetal structure. As a result, the affinity between the hydrophilic group of the side-chain liquid crystal polymer and the substrate surface can be improved, and the homeotropic alignment property of the retardation layer can be further improved.

The surface control layer preferably contains a cured product of an ionizing radiation-curable resin composition containing the polar group, and the surface control layer is more preferably a cured product of an ionizing radiation-curable resin composition containing the polar group, from the viewpoint of being excellent in formability and mechanical strength and good in leveling properties and transfer properties. Being excellent in formability means being formable into a desired shape with high accuracy.

The ionizing radiation-curable resin composition preferably contains a polyfunctional (meth)acrylate containing two or more (meth)acryloyl groups and a monofunctional (meth)acrylate containing an ether bond and only one (meth) acryloyl group.

The polyfunctional (meth)acrylate is in particular preferably a polyfunctional (meth)acrylate containing three or more (meth)acryloyl groups, and more preferably at least one polyfunctional (meth)acrylate selected from the group consisting of pentaerythritol tri(meth)acrylate, pentaerythritol tetra(meth)acrylate, dipentaerythritol triacrylate, dipentaerythritol tetraacrylate, dipentaerythritol penta(meth)acrylate and dipentaerythritol hexa(meth)acrylate.

The monofunctional (meth)acrylate containing an ether bond and only one (meth)acryloyl group is in particular preferably at least one selected from 2-phenoxyethyl (meth) acrylate and tetrahydrofurfuryl (meth)acrylate.

Moreover, the ionizing radiation-curable resin composition preferably contains a vinyl ether compound containing a vinyl ether group, from the viewpoint of increasing the homeotropic alignment property of the retardation layer.

As needed, the ionizing radiation-curable resin composition may further contain various kinds of additives such as a polymerization initiator, a leveling agent, a release agent, a viscosity modifier and an adhesion improving agent.

The thickness of the surface control layer is preferably 0.1 µm or more, and more preferably 0.5 µm or more, from the point of view that the thickness can be easily uniform and the polar groups can be uniformly present. The upper limit of the thickness of the surface control layer is not particularly limited and is appropriately controlled to ensure that the thickness of the whole substrate is not too large. For example, the upper limit can be 10 µm or less, or it may be 5 µm or less.

When the substrate has the structure composed of layers laminated onto each other, or when a homeotropic alignment membrane containing an ultraviolet curable resin is disposed on the substrate, the substrate may contain a primer layer to improve adhesion between the layers. This primer layer is preferably a primer layer which has adhesion to both the adjacent layers and is visible-ray-optically transparent to transmit ultraviolet rays. This layer can make use of, for example, a material selected appropriately from vinyl-chloride/vinyl-acetate copolymer-based and urethane-based materials, and others.

When the homeotropic alignment membrane is not disposed on the substrate, an anchor coat layer may be disposed onto the substrate. The anchor coat layer can improve the substrate in strength and cause the retardation layer to keep a good homeotropic alignment. The material of the anchor coat layer may be a metal alkoxide, in particular, a metal silicon alkoxide sol. The metal alkoxide is usually used in the form of a solution in an alcohol. The anchor coat layer needs to be an even and flexible membrane. Thus, the thickness of the anchor coat layer is preferably about 0.04 µm or more and 2 µm or less, and more preferably about 0.05 µm or more and 0.2 µm or less.

When the substrate contains the anchor coat layer, the transparent substrate and the anchor coat layer may be improved in close adhesion between the two by laminating a binder layer into between the transparent substrate and the anchor coat layer, or by incorporating, into the anchor coat layer, a material for enhancement of close adhesion with the transparent substrate. A binder material used to form the binder layer is usable without any especial restriction, as far as the material is a material that can improve the close adhesion between the transparent substrate and the anchor coat layer. Examples of the binder material include silane coupling agents, titanium coupling agents, and zirconium coupling agents.

4. Method for Producing Retardation Film

The method for producing a retardation film in the embodiment in the present disclosure is not particularly limited, as long as it is a method by which the retardation film in the present disclosure can be yielded. For example, the method may be a method for producing a retardation film, wherein a retardation layer is formed by:

a step of forming, into a film, the liquid crystal composition in the embodiment in the present disclosure, a step of aligning the liquid crystal constitutional unit of the side-chain liquid crystal polymer and the polymerizable liquid crystal compound in the liquid crystal composition formed into the film, and a step of polymerizing the polymerizable liquid crystal compound after the aligning step.

The liquid crystal composition used in the production method may be the same as described in the item "A. Liquid Crystal Composition". Thus, any description thereabout is omitted herein.

(1) Step of Forming Liquid Crystal Composition into Film

As the method for forming the liquid crystal composition into a film, examples include uniformly applying the liquid crystal composition onto a support.

As the support, examples include, but are not limited to, the above-defined substrate, the laminate in which the substrate and the alignment membrane are laminated onto each other, and the alignment membrane having self-supporting performance. As used herein, "onto a support" may be "on the above-defined substrate" or may be "on the alignment membrane".

The method for coating is not particularly limited as long as it is a method capable of forming a film having a desired thickness with a good precision, and may be appropriately selected. Examples thereof include gravure coating, reverse coating, knife coating, dip coating, spray coating, air knife coating, spin coating, roll coating, printing, dip pulling-up, curtain coating, die coating, casting, bar coating, extrusion coating, and E type coating methods.

(2) Step of Aligning Liquid Crystal Component

Next, by heating the liquid crystal composition formed into the film, the liquid crystal constitutional unit of the side-chain liquid crystal polymer and the polymerizable liquid crystal compound in the liquid crystal composition are adjusted into a temperature at which these two can be homeotropically aligned. This heating treatment makes it possible to align the liquid crystal constitutional unit of the side-chain liquid crystal polymer, and the polymerizable liquid crystal compound, and then dried, and to fix the unit and the compound while keeping the alignment state.

The temperature at which the two can be homeotropically aligned, is varied in accordance with individual substances in the liquid crystal composition; thus, a temperature therefor needs to be appropriately adjusted. The heating treatment is conducted, for example, preferably at 40° C. or more and 200° C. or less, more preferably at 40° C. or more and 120° C. or less, and even more preferably at 40° C. or more and 100° C. or less.

The heating means is appropriately selectable from known heating and drying means to be usable.

Moreover, the heating period may be appropriately selected, for example, from periods in a range of 10 seconds or more and 2 hours or less, and preferably in a range of 20 seconds or more and 30 minutes or less.

(3) Step of Polymerizing Polymerizable Liquid Crystal Compound

The polymerizable liquid crystal compound in the coating film can be polymerized by, for example, light irradiation to the coating film fixed in the state that the alignment state of the liquid crystal component is maintained by the aligning step. Thus, a retardation layer containing a cured product of the liquid crystal composition can be gained.

The light irradiation is preferably ultraviolet-ray irradiation. For the ultraviolet-ray irradiation, ultraviolet rays are used which are emitted from light rays of, for example, an ultra-high-pressure mercury lamp, a high-pressure mercury lamp, a low-pressure mercury lamp, a carbon arc, a xenon arc, or a metal halide lamp. The irradiance level of the energy beam source may be appropriately selected. Preferably, the accumulated irradiation dose thereof at an ultraviolet wavelength of 365 nm is, for example, in a range of 10 mJ/cm$^2$ or more and 10000 mJ/cm$^2$ or less.

5. Usage

The retardation film in the present disclosure is favorably used as a retardation film containing a positive C type retardation layer. The retardation film in the present disclosure is favorably used as, for example, a viewing-angle compensation film, and is favorably used for an optical member for various display devices that will be detailed later. More specifically, for example, the retardation film is favorably used as the viewing angle compensation film of a light-emitting display device such as an organic light-emitting display device containing a circularly polarizing plate.

C. Transfer Laminate

A transfer laminate in the first embodiment in the present disclosure is a transfer laminate configured to transfer a retardation layer, wherein the transfer laminate contains a retardation layer and a support supporting the retardation layer in a removable manner;

wherein the retardation layer contains a cured product of a liquid crystal composition containing a side-chain liquid crystal polymer and a polymerizable liquid crystal compound; and wherein the side-chain liquid crystal polymer contains a constitutional unit which is represented by the general formula (I) and a liquid crystal constitutional unit which contains a side chain including a liquid crystal moiety.

A transfer laminate in the second embodiment in the present disclosure is a transfer laminate configured to transfer a retardation layer, wherein the transfer laminate contains a retardation layer and a support supporting the retardation layer in a removable manner;

wherein the retardation layer contains a cured product of a liquid crystal composition containing a side-chain liquid crystal polymer and a polymerizable liquid crystal compound; and wherein the side-chain liquid crystal polymer contains a constitutional unit which is represented by the general formula (I') and a liquid crystal constitutional unit which contains a side chain including a liquid crystal moiety.

The transfer laminate of the present disclosure is configured to transfer the retardation layer. Since the retardation layer contains the cured product of a liquid crystal composition, the retardation layer is excellent in homeotropic alignment property and improved in heat resistance. The transfer laminate of the present embodiment makes it possible to transfer the retardation layer onto, for example, a transfer receiving object such as any other optical member.

Figure 5:
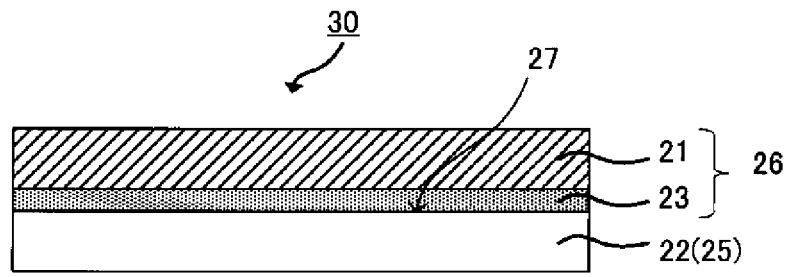
FIG. 5 is a schematic sectional view showing an embodiment of a transfer laminate.

The transfer laminate of the present embodiment makes it possible to transfer, onto the transfer receiving object, the thin retardation film containing no substrate, such as the retardation film 10' which has been illustrated in FIG. 2, which is made only of the retardation layer 1, or a retardation film illustrated in FIG. 5, which includes no substrate and is made only of a laminate in which an alignment membrane 23 and a retardation layer 21 are laminated onto each other. In other words, a retardation layer such as an alignment membrane, and a thin membrane different from a substrate may be further laminated on the retardation layer, which is transferred using the transfer laminate of the present embodiment.

Hereinafter, a description will be made about the structure of such a transfer laminate. However, the liquid crystal composition and retardation layer of the embodiment in the present disclosure have been described above; thus, any description thereabout is omitted herein.

Figure 4:
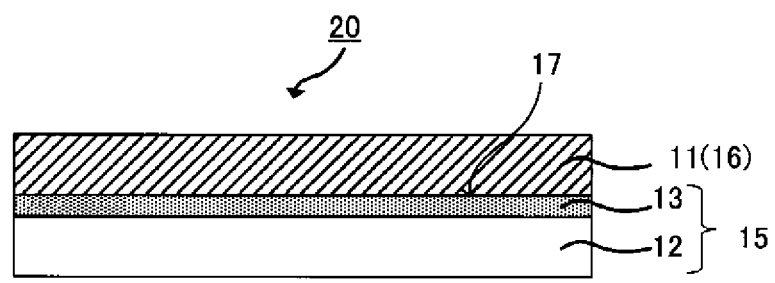
FIG. 4 is a schematic sectional view showing an embodiment of a transfer laminate.
Figure 6:
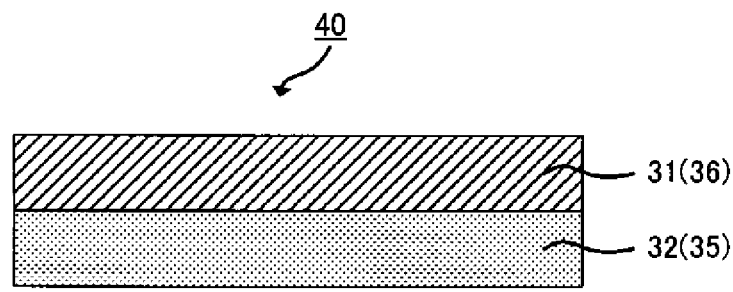
FIG. 6 is a schematic sectional view showing an embodiment of a transfer laminate.

The layer structure of the transfer laminate will be described with reference to the drawings. FIGS. 4 to 6 each show one embodiment of the transfer laminate in the present disclosure.

The one embodiment illustrated in FIG. 4, which is a transfer laminate 20, contains a retardation layer 11 and, as a support 15 supporting the retardation layer in a removable manner, a laminate in which an alignment membrane 13 is laminated onto a second substrate 12. In the transfer laminate 20 illustrated in FIG. 4, the peel strength of the interface between the second substrate 12 and the alignment membrane 13 is larger than the peel strength of the interface between the alignment membrane 13 and the retardation layer 11. In this way, a peel is attained with ease at an interface 17 between the alignment membrane 13 and the retardation layer 11. Thus, from the transfer laminate 20 transferred onto a transfer receiving object, the laminate in which the alignment membrane 13 is laminated onto the second substrate 12, can be peeled to be removed as the peelable support 15, and only the retardation layer 11 can be transferred as a transfer layer 16 containing a retardation layer.

The one embodiment shown in FIG. 5, which is a transfer laminate 30, includes a retardation layer 21 and, as a support 25 supporting the retardation layer in a removable manner, a second substrate 22. The transfer laminate 30 further contains an alignment membrane 23 between the retardation layer 21 and the second substrate 22. In the transfer laminate 30 illustrated in FIG. 5, the peel strength of the interface between the second substrate 22 and the alignment membrane 23 is smaller than the peel strength of the interface between the alignment membrane 23 and the retardation layer 21. In this way, a peel is attained with ease at an interface 27 between the second substrate 22 and the alignment membrane 23. Thus, from the transfer laminate 30 transferred onto a transfer receiving object, the second substrate 22 can be peeled to be removed as the peelable support 25, and the laminate in which the retardation layer 21 and the alignment membrane 23 are laminated onto each other, can be transferred as a transfer layer 26 containing a retardation layer.

For example, whether the peel strength of the interface between the second substrate and the alignment membrane is larger or smaller than the peel strength of the interface between the alignment membrane and the retardation layer, can be checked by peeling off the retardation layer and then checking at which of the two interfaces the peel is made. The checking at which of the two interfaces the peel is made can be analyzed by, for example, IR.

The one embodiment shown in FIG. 6, which is a transfer laminate 40, contains a retardation layer 31 and a second substrate 32 as a support 35 supporting the retardation layer in a removable manner. From the transfer laminate 40 transferred onto a transfer receiving object, the second substrate 32 can be peeled to be removed as the peelable support 35, and only the retardation layer 31 can be transferred as a transfer layer 36 containing a retardation layer.

As the peelable support of the transfer laminate in the present disclosure, examples include, but are not limited to, the substrate described above in "B. Retardation film", a laminate in which the substrate and the alignment membrane are laminated on each other, and the alignment membrane having self-supporting performance.

When the retardation layer is transferred, the interface between the transfer layer containing the retardation layer and the peelable support is separated. The interface to be separated is an interface with the smallest peel strength. Examples of the method for adjusting any of the peel strengths include methods described below.

In order to make the peel strength of the interface between the second substrate 12 and the alignment membrane 13 larger than the peel strength of the interface between the alignment membrane 13 and the retardation layer 11 to gain the transfer laminate 20 illustrated in FIG. 4, for example, a method is usable in which a solvent contained in a composition for forming the alignment membrane is rendered a solvent in which the second substrate can be dissolved. The second substrate is preferably a resin substrate. Surface treatment may be applied to surfaces of the substrate to improve the substrate in adhesion. In such a case, close adhesion between the resin substrate and the alignment membrane can be improved.

Moreover, in order to make the peel strength of the interface between the alignment membrane and the retardation layer small to make the peel strength of the interface between the substrate and the alignment membrane larger than the peel strength of the interface between the alignment membrane and the retardation layer, the solvent resistance of the alignment membrane is preferably made relatively high. In a case where the alignment membrane is relatively high in solvent resistance, the alignment membrane is not easily dissolved in the solvent in the liquid crystal composition when the liquid crystal composition is applied onto the alignment membrane to form the retardation layer. Consequently, the close adhesion between the alignment membrane and the retardation layer can be lowered.

In order to make the peel strength of the interface between the second substrate 22 and the alignment membrane 23 smaller than the peel strength of the interface between the alignment membrane 23 and the retardation layer 21 to gain the transfer laminate 30 illustrated in FIG. 5, for example, a release treatment may be applied onto a surface of the substrate, or a release layer may be formed thereonto. This way makes it possible to heighten the substrate in peelability, and make the peel strength of the interface between the substrate and the alignment layer smaller than the peel strength of the interface between the alignment layer and the retardation layer.

Examples of the release treatment include fluorine treatment, silicone treatment, and other surface treatments.

Examples of the material of the release layer include fluorine-containing release agents, silicone type release agents, and wax type release agents. The method for forming the release layer is, for example, a method of coating a release agent by dip coating, spray coating, roll coating, or some other coating method.

Also, in order to gain the transfer laminate 40 illustrated in FIG. 6, a release treatment may be applied onto a surface of the substrate, or a release layer may be formed thereonto, as required.

The support used in the transfer laminate may have flexibility or may not have flexibility. Preferably, the substrate has flexibility since the support is easily peeled to be removed.

In general, the thickness of the support used in the transfer laminate is preferably in a range of 20 μm or more and 200 μm or less, from the viewpoint of the balance between a sufficient self-supporting performance of the substrate, and the flexibility thereof that permits the substrate to be adapted to the production of the transfer laminate in the present embodiment and the transfer step thereof.

A retardation layer that can be supplied from the transfer laminate in the present disclosure is favorably used for the same use purposes as that of the retardation film. The positive C-type retardation layer can be transferred to an optical member for various display devices. The retardation layer that can be supplied from the transfer laminate in the present disclosure is favorably used to supply a thin optical member. Also, the retardation layer that can be supplied from the transfer laminate in the present disclosure is favorably used as the viewing angle compensation film of a light-emitting display device such as an organic light-emitting display device containing a circularly polarizing plate.

D. Optical Member

An optical member in the present disclosure is an optical member containing the retardation film in the present disclosure and a polarization plate disposed thereon.

Figure 7:
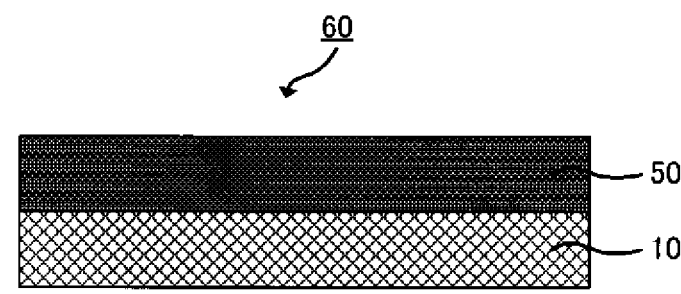
FIG. 7 is a schematic sectional view showing an embodiment of an optical member.

The optical member of the present embodiment will be described with reference to the drawings. FIG. 7 is a schematic sectional view showing an embodiment of the optical member.

In an example of an optical member 60 in FIG. 7, a polarizing plate 50 is located on a retardation film 10, which is the retardation film in the present disclosure. The optical member optionally contains a pressure-sensitive-adhesive layer (adhesive layer) (not illustrated) between the retardation film 10 and the polarizing plate 50.

In the present embodiment, the polarizing plate is a plate-form member through which only a light ray vibrating in a specific direction is transmitted, and may be appropriately selected from polarizing plates known in the prior art. The polarizing plate is, for example, a polyvinyl alcohol film, a polyvinyl formal film, a polyvinyl acetal film, or an ethylene/vinyl-acetate copolymer saponified film, all of which have been dyed with iodine or a dye, and then stretched.

In the present embodiment, a pressure-sensitive-adhesive or adhesive for the pressure-sensitive-adhesive layer (adhesive layer) may be appropriately selected from such adhesives known in the prior art. Thus, a pressure-sensitive-adhesive or adhesive in any adhering form is usable, examples thereof including pressure-sensitive-adhesives, two-part curable adhesives, ultraviolet curable adhesives, thermally curable adhesives, and holt-melt adhesives.

The optical member of the present embodiment may further contain, besides the polarizing plate, a different layer which a known optical member contains. Examples of the different layer include retardation layers different from the retardation layer of the present embodiment, an antireflective layer, a diffusion layer, an antiglare layer, an antistatic layer, and a protective film. However, the different layer is not limited to these layers.

The optical member of the present embodiment is usable as, for example, an optical member for restraining the reflection of external light. The optical member in the present disclosure, in which the retardation film in the present disclosure and a circularly polarizing plate are laminated onto each other, is favorably usable as, for example, an optical member for restraining external-light-reflection for a light emitting display device, and is also usable for a wide-viewing-angle polarizing plate for various display devices.

E. Method for Producing Optical Member

A method in the present disclosure for producing an optical member is not particularly limited, and may be appropriately selected from methods of laminating a polarizing plate onto the retardation film in the present disclosure. The method is, for example, a producing method of laminating a polarizing plate onto the retardation film in the present disclosure via a pressure-sensitive-adhesive layer or adhesive layer.

A method of an embodiment in the present disclosure for producing an optical member is a method for producing an optical member, the method including:

a step of preparing the transfer laminate in one embodiment in the present disclosure (a transfer laminate preparing step), a transfer step in which a transfer receiving object containing at least a polarization plate, is faced to the retardation layer of the transfer laminate, and the transfer laminate is transferred onto the transfer receiving object, and a removal step in which the support is removed from the transfer laminate transferred onto the transfer receiving object.

The optical member producing method of the embodiment in the present disclosure, using the above-defined transfer laminate, makes it possible to yield an optical member containing the polarizing plate and the retardation layer on which no substrate is laminated, out of the retardation film of the embodiment in the present disclosure.

The transfer laminate used in the optical member producing method of the embodiment in the present disclosure may be the same as described in the item "C. Transfer laminate". Thus, any description thereabout is omitted herein.

The transfer receiving object used in the optical member producing method of the embodiment in the present disclosure is typically a transfer receiving object containing an adhesive layer and a polarizing plate. However, the transfer receiving object is not limited thereto. The transfer receiving object may further contain one or more of the same different layers as the optical member of the embodiment in the present disclosure may contain.

F. Display Device

A display device in the present disclosure is a display device containing the retardation film or optical member of the present disclosure.

Examples of the display device include light emitting display devices such as an organic light-emitting display device, and liquid crystal display devices. However, the display device is not limited to these examples.

The display device contains, particularly, the retardation film of the present embodiment or the optical member of the present embodiment; thus, in particular, the light-emitting display device which is, for example, an organic light emitting display device containing a transparent electrode layer, a light emitting layer and an electrode layer in this order has an advantageous effect of improving the viewing angle while external light reflection is restrained.

Figure 8:
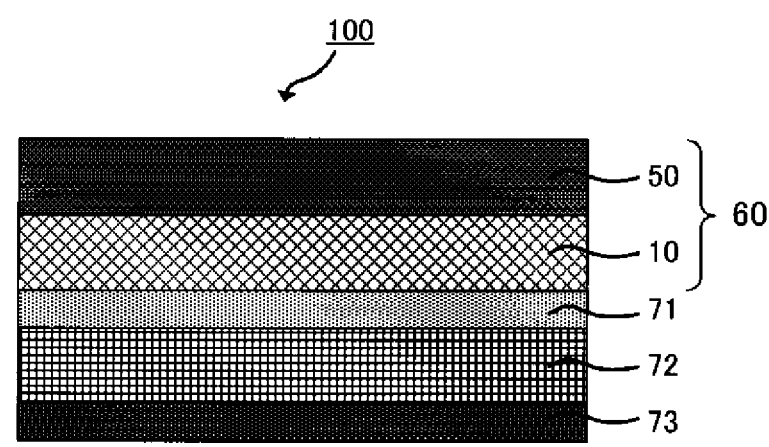
FIG. 8 is a schematic sectional view showing an embodiment of a display device.

The following will describe an example of a light emitting display device that is one embodiment, referring to a figure. FIG. 8 is a schematic sectional view showing one embodiment of the organic light emitting display device.

In the example in FIG. 8, which is an organic light emitting display device 100, a polarizing plate 50 is located on a light-emitting-out surface side of the same retardation film 10 as described above, and further this display device contains, on the surface of the retardation film that is opposite to the former surface, a transparent electrode layer 71, a light emitting layer 72, and an electrode layer 73 in this order. The light emitting layer 72 contains, for example, a structure in which from the transparent electrode layer 71 side of the device, the following layers are laminated in turn: a hole injecting layer; a hole transporting layer; a light emitting layer; and an electron injecting layer. In the present embodiment, known layers and other constituents are appropriately used for the transparent electrode layer, the hole injecting layer, the hole transporting layer, the light emitting layer, the electron injecting layer, the electrode layer, and other constituents. The light emitting display device produced in this manner is applicable to, for example, an organic EL display in a passive driving manner, and an organic EL display in an active driving manner.

The display device in the present embodiment is not limited to the above-mentioned structure, and is applicable into an appropriately-selective known structure.

EXAMPLES

Synthesis Example 1: Synthesis of Liquid Crystal Monomer 1

First, in accordance with a scheme 1 illustrated below, 4-[2-(acryloyloxy)ethoxy]benzoic acid was synthesized.

First, 2-bromoethanol (20 g, 162 mmol) was added to a suspension of ethyl 4-hydroxybenzoate (28 g, 170 mmol) and potassium carbonate (26 g, 187 mmol) in DMF (1 L). The suspension was stirred for 8 hours at 80° C. After the end of the reaction, the reaction solution was diluted with water; the reaction product was extracted with ethyl acetate; and the solvent was distilled off. The resultant crude product was added to an aqueous solution of potassium hydroxide (11 g, 187 mmol) and reacted at 100° C. for 4 hours for hydrolysis. After the end of the reaction, a hydrochloric acid aqueous solution and then ethyl acetate were added thereto; the reaction product was extracted therewith; and the solvent was then distilled off. The residue was purified by silica gel chromatography, and the solvent was distilled off to yield p-(2-hydroxyethoxy)benzoic acid with a yield of 89% (26 g, 145 mmol).

Next, a suspension of p-(2-hydroxyethoxy)benzoic acid (16 g, 90 mmol), acryloyl chloride (7.4 g, 82 mmol) and dimethylaniline (DMA) (9.9 g, 82 mmol) in tetrahydrofuran (THF) (400 mL) was stirred for 12 hours. After the end of the reaction, water and ethyl acetate were added to the reaction solution, and then the resultant was separated into two liquid phases. The solvent was then distilled off. The residue was purified by silica gel chromatography, and the solvent was distilled off to yield 4-[2-(acryloyloxy)ethoxy] benzoic acid with a yield of 90% (17.4 g, 73.8 mmol).

Scheme 1

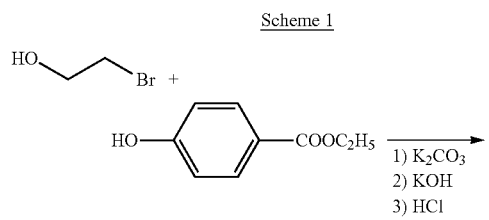

Scheme 2

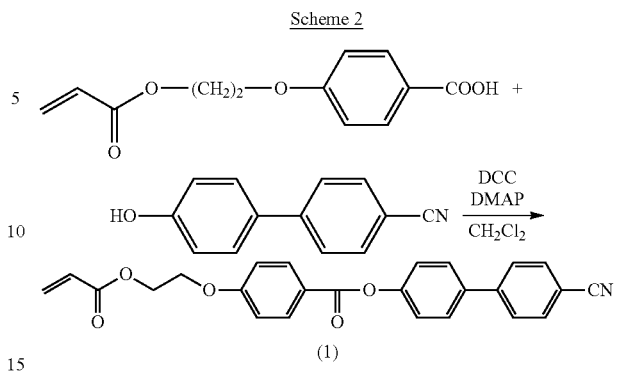

Synthesis Example 2: Synthesis of Liquid Crystal Monomer 2

A liquid crystal monomer 2 represented by the following chemical formula (2) was yielded in the same way as in Synthesis Example 1, except that 6-chloro-1-n-hexanol was used instead of 2-bromoethanol.

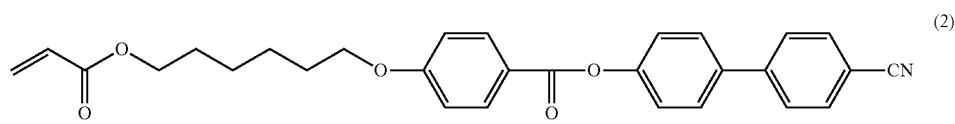 [SMILES: C=CC(=O)OCCCCCCOc1ccc(C(=O)Oc2ccc(-c3ccc(C#N)cc3)cc2)cc1]

-continued

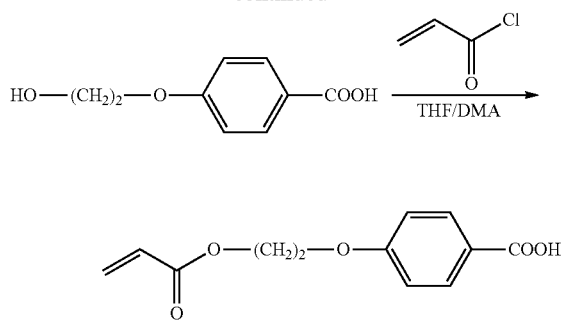

Next, in accordance with the following scheme 2, a liquid crystal monomer 1 represented by the following chemical formula (1) was yielded.

To a suspension of 4-[2-(acryloyloxy)ethoxy]benzoic acid (17 g, 70 mmol), 4'-cyano-4-hydroxybiphenyl (14 g, 70 mmol) and N,N-dimethylaminopyridine (DMAP) (252 mg, 2.10 mmol) in dichloromethane (90 mL) was dropwise added a solution of N,N-dicyclohexylcarbodiimide (DCC) (16 g, 76 mmol) in dichloromethane (10 mL). After the end of the addition, the reaction system was stirred for 12 hours, and the precipitation was filtrated to be collected. Thereafter, the solvent was distilled off. To the resultant crude product was added methanol (200 mL), and the resultant was stirred at room temperature for 1 hour to be suspended and purified. The precipitation was filtrated, and the resultant crystal was dried to yield 4'-cyano-4-{4-[6-(acryloyloxy)ethyloxy]benzoate} (the following chemical formula (1)) with a yield of 93% (28 g, 67 mmol).

Synthesis Example 3: Synthesis of Liquid Crystal Monomer 3

First, in accordance with the following scheme 3, 4-propoxycarbonylphenyl=4-hydroxybenzoate represented by the following chemical formula (a) was yielded.

To a suspension of 4-acetoxybenzoic acid (15 g, 84 mmol), propyl 4-hydroxybenzoate (14 g, 80 mmol) and N,N-dimethylaminopyridine (DMAP) (0.59 g, 4.9 mmol) in dichloromethane (100 mL) was dropwise added a solution of N,N-dicyclohexylcarbodiimide (DCC) (17 g, 84 mmol) in dicyclomethane (10 mL). After the end of the addition, the reaction system was stirred for 12 hours, and the precipitation was filtrated to be collected. Thereafter, the solvent was distilled off. Methanol (100 mL) was added to the resultant oily substance to dissolve the substance, and then thereto was dropwise added a solution of potassium carbonate (13 g, 93 mmol) in water (50 mL) while the reaction system was cooled. The reaction mixture was stirred for 1 hour, and then neutralized with a 35% hydrochloric acid (9.4 mL). The precipitated crystal was filtrated to be collected. The crude product was dried to yield 4-propoxycarbonylphenyl-4-hydroxybenzoate with a two-stage yield of 73% (17 g, 58 mmol).

Scheme 3

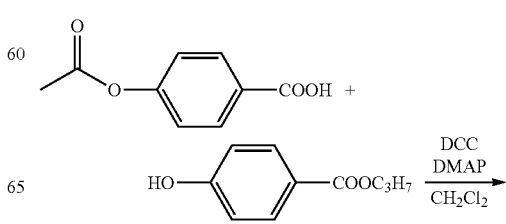

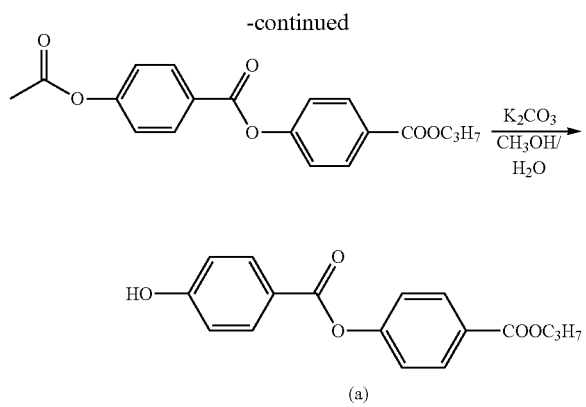

(a)

Next, in accordance with the following scheme 4, a liquid crystal monomer 3 represented by the following chemical formula (3) was yielded.

To a suspension of 4-propoxycarbonylphenyl-4-hydroxybenzoate (15 g, 50 mmol), 4-[6-(acryloyloxy)hexyloxy]benzoic acid (14 g, 48 mmol) and N,N-dimethylaminopyridine (DMAP) (0.17 g, 1.3 mmol) in dichloromethane (60 mL) was dropwise added a solution of N,N-dicyclohexylcarbodiimide (DCC) (11 g, 52 mmol) in dichloromethane (10 mL). After the end of the addition, the reaction system was stirred for 12 hours, and the precipitation was filtrated to be collected. Thereafter, the solvent was distilled off. Methanol was added to the resultant crude product for recrystallization, and the resultant crystal was dried to yield 4-(4-propoxycarbonylphenyloxycarbonyl)phenyl-4-[6-(acryloyloxy)hexyloxy]benzoate (represented by the following chemical formula (3)) with a yield of 88% (24 g, 44 mmol)).

Scheme 4

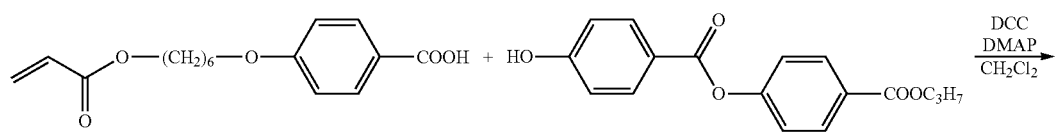

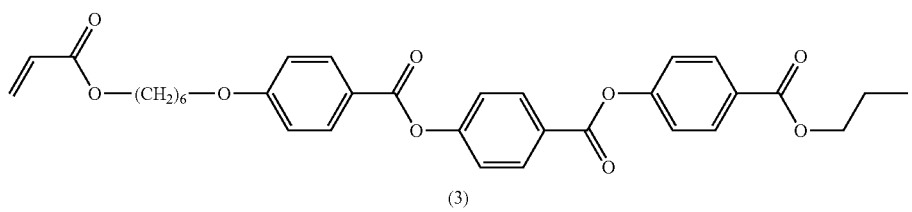

(3)

Synthesis Example 4: Synthesis of Liquid Crystal Monomer 4

First, in accordance with the following scheme 5, 4-hydroxy-4"-propylterphenyl was synthesized.

To a reaction container, 4-bromophenol (10 g, 58 mmol), 4'-propyl-4-biphenylboronic acid (15 g, 64 mmol), potassium carbonate (12 g, 87 mmol) and tetrakis (triphenylphosphine)palladium (670 mg, 0.58 mmol) were added. The inside of the container was substituted by nitrogen. Acetone (100 ml) and water (20 ml) was added thereto, and the mixture was refluxed for 8 hours. After the end of the reaction, the reaction solution was added to 1 N hydrochloric acid, and the mixed reaction solution was stirred for 10 minutes. Next, ethyl acetate was further added thereto, and then the resultant was separated into two liquid phases. The solvent was then distilled off. The residue was purified by silica gel chromatography, and the solvent was distilled off to yield 4-hydroxy-4"-propylterphenyl with a yield of 89% (15 g, 51 mmol).

Scheme 5

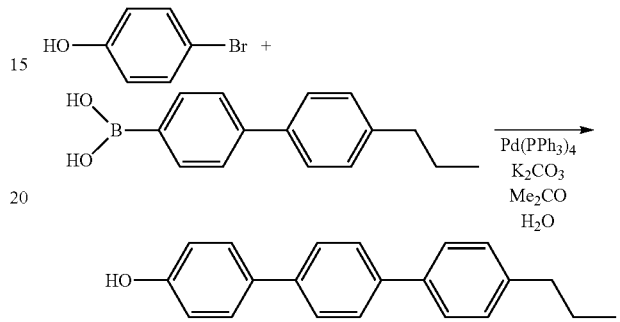

Next, a liquid crystal monomer 4 represented by the following chemical formula (4) was yielded in the same way as in the scheme 1, except that the resultant 4-hydroxy-4"-propylterphenyl was used instead of ethyl 4-hydroxybenzoate.

(4)

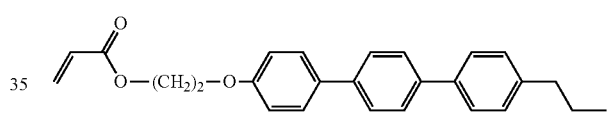

Synthesis Example 5: Synthesis of Liquid Crystal Monomer 5

A liquid crystal monomer 5 represented by the following chemical formula (5) was yielded in the same way as in Synthesis Example 1, except that 4-hydroxybenzonitrile was used instead of 4'-cyano-4-hydroxybiphenyl:

(5)

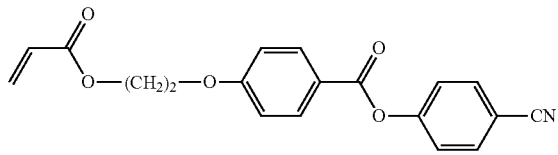

Synthesis Example 6: Synthesis of Monomer A

A monomer A represented by the following chemical formula (A) was yielded in the same way as in the scheme 1, except that 11-bromo-3,6,9-trioxaundecane-1-ol was used instead of 2-bromoethanol, and 1-nonanol was used instead of ethyl 4-hydroxybenzoate.

In the monomer A represented by the following chemical formula (A), the cardinal number of —$(CH_2CH_2O)_4$— by the Davies method, is 1.32, and the cardinal number of —$(CH_2)_8$—$CH_3$ by the Davies method, is −4.275.

Chemical Formula (A)

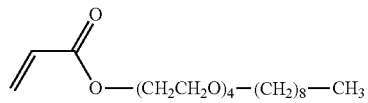

Synthesis Example 7: Synthesis of Monomer B

A monomer B represented by the following chemical formula (B) was yielded in the same way as in Synthesis Example 6, except that 23-bromo-3,6,9,12,15,18,21-heptaoxatricosan-1-ol was used instead of 11-bromo-3,6,9-trioxaundecane-1-ol.

In the monomer B represented by the following chemical formula (B), the cardinal number of —$(CH_2CH_2O)_8$— by the Davies method, is 2.64, and the cardinal number of —$(CH_2)_8$—$CH_3$ by the Davies method, is −4.275.

Chemical Formula (B)

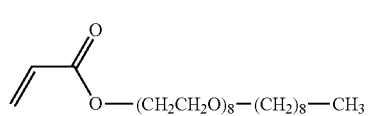

Synthesis Example 8: Synthesis of Monomer C

A monomer C represented by the following chemical formula (C) was yielded in the same way as in Synthesis Example 6, except that 1-docosanol was used instead of 1-nonanol.

In the monomer C represented by the following chemical formula (C), the cardinal number of —$(CH_2CH_2O)_4$— by the Davies method, is 1.32, and the cardinal number of —$(CH_2)_{21}$—$CH_3$ by the Davies method, is −10.45.

Chemical Formula (C)

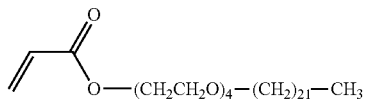

As a monomer D represented by the following chemical formula (D), a product FA-314A manufactured by Hitachi Chemical Co., Ltd., was used. The monomer D is represented by the following chemical formula (D) (where the average of n is 4) and contains at least a compound represented by the following chemical formula (D) (where n=4).

In the monomer D represented by the following chemical formula (D), the cardinal number of —$(CH_2CH_2O)_4$— by the Davies method, is 1.32, and the cardinal number of —$C_6H_4$—$(CH_2)_8$—$CH_3$ by the Davies method, is −7.125. Also in the following chemical formula (D), —$C_6H_4$— denotes a p-phenylene group.

Chemical Formula (D)

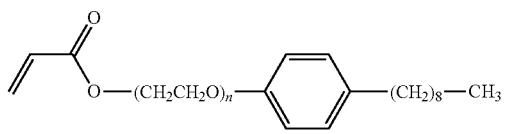

n = 4

Synthesis Example 9: Synthesis of Monomer E

In a nitrogen atmosphere, the temperature of a solution of 1-nonanol (10 g, 69 mmol) and N,N-dimethylbenzylamine (0.88 mg, 6.5 µmol) in cyclohexanone (20 ml) was raised to 110° C. Then, glycidyl acrylate (8.1 g, 63 mmol) was dropwise added thereto. After the end of the addition, the reaction solution was stirred for 1 hour. After the end of the reaction, the reaction solution was added to 1N hydrochloric acid. Next, ethyl acetate was further added thereto, and then the resultant was separated into two liquid phases. The organic phase was washed with saturated salt water and dried with magnesium sulfate. Thereafter, the solvent in the resultant organic phase was distilled off. The residue was purified by silica gel chromatography, and the solvent was distilled off to yield a monomer E represented by the following chemical formula (E) with a yield of 51% (8.7 g, 32 mmol).

In the monomer E represented by the following chemical formula (E), the cardinal number of —$CH_2CH(OH)CH_2$—O— by the Davies method, is 1.775, and the cardinal number of —$(CH_2)_8$—$CH_3$ by the Davies method, is −4.275.

Chemical Formula (E)

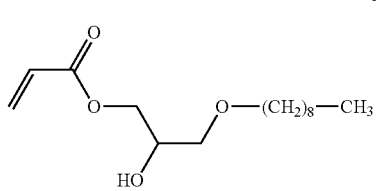

As a monomer F represented by the following chemical formula (F), a product FA-318AS manufactured by Hitachi Chemical Co., Ltd., was used. The monomer F is represented by the following chemical formula (F) (where the average of n is 8) and contains at least a compound represented by the following chemical formula (F) (where n=8).

In the monomer F represented by the following chemical formula (F), the cardinal number of —$(CH_2CH_2O)_8$— by the Davies method, is 2.64, and the cardinal number of —$C_6H_4$—$(CH_2)_8$—$CH_3$ by the Davies method, is −7.125.

Chemical Formula (F)

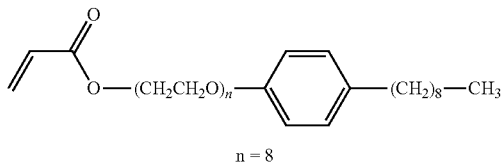

n = 8

As a monomer G represented by the following chemical formula (G), a product NEW FRONTIER N-177E manufactured by Dai-Ichi Kogyo Seiyaku Co., Ltd., was used. The monomer G is a mixture of a compound represented by the following chemical formula (G) (where n=16) and a compound represented by the following chemical formula (G) (where n=17).

In the monomer G represented by the following chemical formula (G), the cardinal number of —$(CH_2CH_2O)_{16}$— by the Davies method, is 5.28; the cardinal number of —$(CH_2CH_2O)_{17}$— by the Davies method, is 5.61; and the cardinal number of —$C_6H_4$—$(CH_2)_8$—$CH_3$ by the Davies method, is −7.125.

Chemical Formula (G)

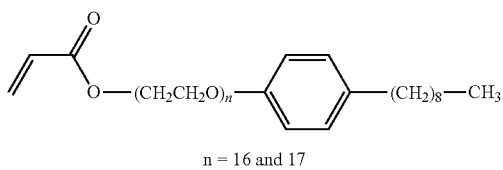

n = 16 and 17

Synthesis Example 10: Synthesis of Monomer H

To a suspension of 2-(2-hydroxyethoxy)ethyl acrylate (12 g, 73 mmol), decanoic acid (15 g, 73 mmol) and N,N-dimethylaminopyridine (DMAP) (0.27 g, 2.2 mmol) in dichloromethane (400 mL) was dropwise added a solution of N,N-dicyclohexylcarbodiimide (DCC) (16 g, 79 mmol) in dichloromethane (90 mL). After the end of the addition, the reaction system was stirred for 12 hours, and the precipitation was filtrated to be collected. Thereafter, the solvent was distilled off. To the resultant crude product was added methanol (200 mL), and the resultant was stirred for 1 hour to be suspended and purified. The precipitation was filtrated, and the resultant crystal was dried to yield a monomer H represented by the following chemical formula (H) with a yield of 63% (14 g, 46 mmol).

In the monomer H represented by the following chemical formula (H), the cardinal number of —$CH_2CH_2O$—$(CH_2)_2$—O—CO— by the Davies method, is 1.78, and the cardinal number of —$(CH_2)_8$—$CH_3$ by the Davies method, is −4.275.

Chemical Formula (H)

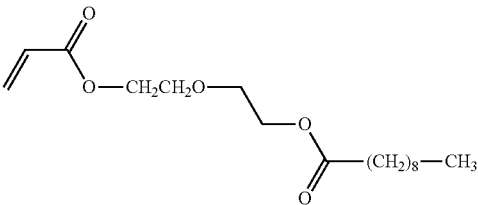

Synthesis Example 11: Synthesis of Monomer I

First, 4,8,12,16,20-pentaoxaheptacosanol was synthesized in accordance with the following scheme 6.

In particular, hydrogen bromide (33% acetic acid solution, 17 g) was dropwise added at 0° C. to 4,8,12,16-tetraoxanonadecane-1,19-diol (15 g, 49 mmol). After the end of the addition, the reaction solution was stirred for 2 hours at 40° C. After the end of the reaction, ethyl acetate was added thereto, and the resultant was washed with sodium hydrogen carbonate aqueous solution and water. The organic phase was dried with sodium sulfate. Then, the solvent of the organic phase was distilled off to yield 19-bromo-4,8,12,16-tetraoxanonadecane-1-ol with a yield of 46% (8.3 g, 22 mmol).

Then, 4,8,12,16,20-pentaoxaheptacosanol was yielded in the same way as in the first step of the scheme 1, except that 19-bromo-4,8,12,16-tetraoxanonadecane-1-ol was used instead of 2-bromoethanol, and 1-heptanol was used instead of ethyl 4-hydroxybenzoate.

Scheme 6

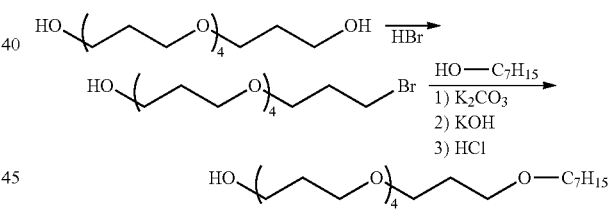

Thereafter, a monomer I represented by the following chemical formula (I) was yielded in the same way as in the scheme 1, except that 11-bromo-3,6,9-trioxaundecane-1-ol was used instead of 2-bromoethanol, and 4,8,12,16,20-pentaoxaheptacosanol was used instead of ethyl 4-hydroxybenzoate.

In the monomer I represented by the following chemical formula (I), the cardinal number of —$(CH_2CH_2O)_4$— by the Davies method, is 1.32, and the cardinal number of —$(HCH_2CH_2CH_2O)_5$—$(CH_2)_6$—$CH_3$ by the Davies method, is −3.95.

Chemical Formula (I)

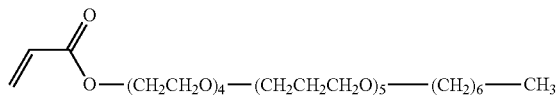

Synthesis Example 12: Synthesis of Monomer J

A monomer J represented by the following chemical formula (J) was yielded in the same way as in Synthesis Example 11, except that 1,3-propanediol was used instead of 4,8,12,16-tetraoxanonadecane-1,19-diol.

In the monomer J represented by the following chemical formula (J), the cardinal number of —$(CH_2CH_2O)_4$— by the Davies method, is 1.32, and the cardinal number of —$CH_2CH_2CH_2O$—$(CH_2)_6$—$CH_3$ by the Davies method, is −3.45.

Chemical Formula (J)

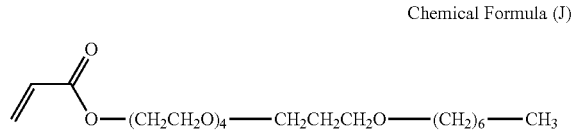

Synthesis Example 13: Synthesis of Monomer K

A monomer K represented by the following chemical formula (K) was yielded in the same way as in Synthesis Example 6, except that 4-phenylphenol was used instead of 1-nonanol.

In the monomer K represented by the following chemical formula (K), the cardinal number of —$(CH_2CH_2O)_4$— by the Davies method, is 1.32, and the cardinal number of —$C_6H_4$—$C_6H_5$ by the Davies method, is −5.7. Also in the following chemical formula (K), —$C_6H_4$—$C_6H_5$ denotes a 4-biphenyl group.

Chemical Formula (K)

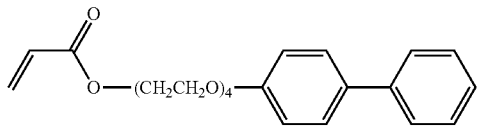

Synthesis Example 14: Synthesis of Monomer L

A monomer L represented by the following chemical formula (L) was yielded in the same way as in Synthesis Example 9, except that 4,5-epoxypentyl acrylate was used instead of glycidyl acrylate.

In the monomer L represented by the following chemical formula (L), the cardinal number of —$(CH_2)_3$—$CH(OH)CH_2O$— by the Davies method, is 0.825, and the cardinal number of —$(CH_2)_8$—$CH_3$ by the Davies method, is −4.275.

Chemical Formula (L)

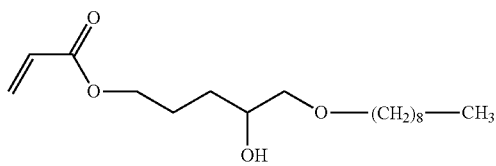

As a monomer M represented by the following chemical formula (M), a product LIGHT-ACRYLATE EHGD-AT manufactured by Kyoeisha Chemical Co., Ltd., was used.

In the monomer M represented by the following chemical formula (M), the cardinal number of —$(CH_2CH_2O)_2$— by the Davies method, is 0.66, and the cardinal number of —$CH_2CH(C_2H_5)$—$C_4H_9$ by the Davies method, is −3.8.

Chemical Formula (M)

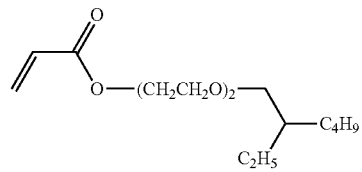

Synthesis Example 15: Synthesis of Monomer N

A monomer N represented by the following chemical formula (N) was yielded in the same way as in Synthesis Example 10, except that 2-(2-aminoethoxy)ethyl acrylate was used instead of 2-(2-hydroxyethoxy)ethyl acrylate.

Chemical Formula (N)

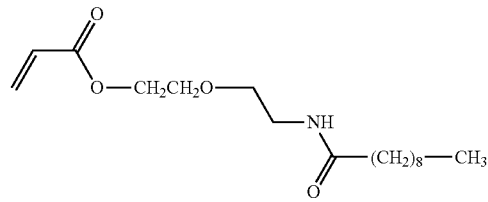

As a monomer O represented by the following chemical formula (O), stearyl acrylate manufactured by Tokyo Chemical Industry Co., Ltd., was used.

In the monomer O represented by the following chemical formula (O), the cardinal number of —$(CH_2)_{17}$—$CH_3$ by the Davies method, is −8.55.

Chemical Formula (O)

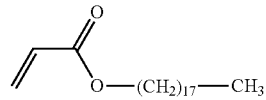

Synthesis Example 16: Synthesis of Monomer P

A monomer P represented by the following chemical formula (P) was yielded in the same way as in Synthesis Example 6, except that 2-bromoethanol was used instead of 11-bromo-3,6,9-trioxaundecane-1-ol.

In the monomer P represented by the following chemical formula (P), the cardinal number of —$CH_2CH_2O$— by the Davies method, is 0.33, and the cardinal number of —$(CH_2)_8$—$CH_3$ by the Davies method, is −4.275.

Chemical Formula (P)

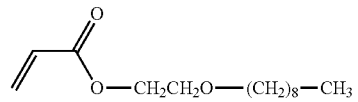

Hereinafter, the monomers A to P may each be referred to as a non-liquid-crystal monomer.

Production Example 1: Synthesis of Side-Chain Liquid Crystal Polymer A-1

Azoisobutyronitrile (AIBN) (82 mg, 0.5 mmol) was dropwise added to a suspension of the liquid crystal monomer 1 (29 g, 65 mmol) and the monomer A (13 g, 35 mmol) in N,N-dimethylacetoamide (DMAc) (200 mL). After the end of the addition, the reaction system was stirred at 80° C. for 6 hours. After the end of the reaction, the reaction liquid was cooled to room temperature, and then dropwise added to another container in which methanol was stirred. The liquid was stirred, filtrated and then dried to yield the side-chain liquid crystal polymer A-1 with a yield of 73% (36 g).

For the resultant side-chain liquid crystal polymer A-1, the structure was analyzed by $^1$H-NMR.

The $^1$H-NMR analysis result is shown below.

<Side-Chain Liquid Crystal Polymer A-1>
$^1$H-NMR (400 MHz, DMSO-d6, TMS): 0.60 to 1.81 (m, Alkyl-H), 3.50 to 4.44 (m, —O—CH$_2$—), 6.75 to 7.77 (m, Aromatic-H), 8.13 (bs, CN—C=CH—)

From the $^1$H-NMR analysis result, the copolymerization ratio (molar ratio) of the liquid crystal monomer 1 to the monomer A was obtained, which was 67:33. The mass average molecular weight Mw was measured by the above-mentioned GPC, which was 22000.

Production Examples 2 to 5: Synthesis of Side-Chain Liquid Crystal Polymers A-1 to A-5

Side-chain liquid crystal polymers A-2 to A-5 were yielded in the same way as in Production Example 1, except that the amount of the liquid crystal monomer 1 and that of the monomer A were changed as shown in Table 1.

TABLE 1

| Liquid crystal polymer | A-1 | A-2 | A-3 | A-4 | A-5 |
|---|---|---|---|---|---|
| Liquid crystal monomer 1 (mmol) | 65 | 15 | 36 | 52 | 78 |
| Monomer A (mmol) | 35 | 85 | 64 | 48 | 22 |

For the Resultant Side-Chain Liquid Crystal Polymers A-2 to A-5, the $^1$H-NMR analysis results are shown below.

For the side-chain liquid crystal polymers A-2 to A-5, the following Table 3 shows the copolymerization ratio (molar ratio) of the liquid crystal monomer 1 to the monomer A obtained from the $^1$H-NMR analysis results, and the mass average molecular weight Mw measured by the above-mentioned GPC.

<Side-Chain Liquid Crystal Polymer A-2>
$^1$H-NMR (400 MHz, DMSO-d6, TMS): 0.55 to 1.83 (m, Alkyl-H), 3.53 to 4.44 (m, —O—CH$_2$—), 6.78 to 7.70 (m, Aromatic-H), 8.13 (bs, CN—C=CH—)

<Side-Chain Liquid Crystal Polymer A-3>
$^1$H-NMR (400 MHz, DMSO-d6, TMS): 0.57 to 1.83 (m, Alkyl-H), 3.51 to 4.47 (m, —O—CH$_2$—), 6.76 to 7.74 (m, Aromatic-H), 8.14 (bs, CN—C=CH—)

<Side-Chain Liquid Crystal Polymer A-4>
$^1$H-NMR (400 MHz, DMSO-d6, TMS): 0.58 to 1.84 (m, Alkyl-H), 3.49 to 4.45 (m, —O—CH$_2$—), 6.74 to 7.77 (m, Aromatic-H), 8.13 (bs, CN—C=CH—)

<Side-Chain Liquid Crystal Polymer A-5>
$^1$H-NMR (400 MHz, DMSO-d6, TMS): 0.63 to 1.80 (m, Alkyl-H), 3.50 to 4.45 (m, —O—CH$_2$—), 6.78 to 7.76 (m, Aromatic-H), 8.13 (bs, CN—C=CH—)

Production Examples 6 and 7: Synthesis of Side-Chain Liquid Crystal Polymers A-6 and A-7

Side-chain liquid crystal polymers A-6 and A-7 were yielded in the same way as in Production Example 1, except that the amount of N,N-dimethylacetamide (DMAc) was changed as shown in Table 2.

TABLE 2

| Liquid crystal polymer | A-1 | A-6 | A-7 |
|---|---|---|---|
| DMAc (mL) | 200 | 800 | 100 |

For the resultant side-chain liquid crystal polymers A-6 and A-7, the $^1$H-NMR analysis results are shown below. For the side-chain liquid crystal polymers A-6 and A-7, the following Table 3 shows the copolymerization ratio (molar ratio) of the liquid crystal monomer 1 to the monomer A obtained from the $^1$H-NMR analysis results, and the mass average molecular weight Mw measured by the above-mentioned GPC.

<Side-Chain Liquid Crystal Polymer A-6>
$^1$H-NMR (400 MHz, DMSO-d6, TMS): 0.64 to 1.80 (m, Alkyl-H), 3.50 to 4.42 (m, —O—CH$_2$—), 6.75 to 7.72 (m, Aromatic-H), 8.13 (bs, CN—C=CH—)

<Side-Chain Liquid Crystal Polymer A-7>
$^1$H-NMR (400 MHz, DMSO-d6, TMS): 0.59 to 1.81 (m, Alkyl-H), 3.51 to 4.44 (m, —O—CH$_2$—), 6.75 to 7.77 (m, Aromatic-H), 8.13 (bs, CN—C=CH—)

TABLE 3

| Liquid crystal polymer | Liquid crystal monomer (m) | Non-liquid-crystal monomer (n) | Copolymerization ratio m:n | Molecular weight Mw |
|---|---|---|---|---|
| A-1 | 1: CH$_2$=C(CH$_3$)—C(=O)—O—(CH$_2$)$_2$—O—C$_6$H$_4$—C(=O)—O—C$_6$H$_4$—C$_6$H$_4$—CN | A: CH$_2$=CH—C(=O)—O—(CH$_2$CH$_2$O)$_4$—(CH$_2$)$_8$—CH$_3$ | 67:33 | 22000 |
| A-2 | | | 20:80 | 15000 |
| A-3 | | | 40:60 | 17500 |
| A-4 | | | 55:45 | 21000 |
| A-5 | | | 80:20 | 30000 |
| A-6 | | | 65:35 | 3000 |
| A-7 | | | 65:35 | 50000 |

Production Examples 8 to 11: Synthesis of
Side-Chain Liquid Crystal Polymers A-8 to A-11

Side-chain liquid crystal polymers A-8 to A-11 were yielded in the same way as in Production Example 1, except that the liquid crystal monomer was changed as shown in Table 4, and the amounts of the liquid crystal monomers of Production Examples 8 to 11 were controlled to be the same molar amount (65 mmol). For the resultant side-chain liquid crystal polymers A-8 to A-11, the $^1$H-NMR analysis results are shown below. For the side-chain liquid crystal polymers A-8 to A-11, the following Table 4 shows the copolymerization ratio (molar ratio) of the liquid crystal monomer to the non-liquid-crystal monomer obtained from the $^1$H-NMR analysis results, and the mass average molecular weight Mw measured by the above-mentioned GPC.

<Side-Chain Liquid Crystal Polymer A-8>
$^1$H-NMR (400 MHz, DMSO-d6, TMS): 0.60 to 1.80 (m, Alkyl-H), 3.44 to 4.46 (m, —O—CH$_2$—), 6.75 to 7.77 (m, Aromatic-H), 8.13 (bs, CN—C=CH—)

<Side-Chain Liquid Crystal Polymer A-9>
$^1$H-NMR (400 MHz, DMSO-d6, TMS): 0.61 to 1.82 (m, Alkyl-H), 3.63 to 4.32 (m, —O—CH$_2$—), 6.98 to 7.72 (m, Aromatic-H)

<Side-Chain Liquid Crystal Polymer A-10>
$^1$H-NMR (400 MHz, DMSO-d6, TMS): 0.61 to 1.81 (m, Alkyl-H), 2.56 (bs benzyl-H), 3.58 to 4.41 (m, —O—CH$_2$—), 6.52 to 7.45 (m, Aromatic-H)

<Side-Chain Liquid Crystal Polymer A-11>
$^1$H-NMR (400 MHz, DMSO-d6, TMS): 0.60 to 1.81 (m, Alkyl-H), 3.50 to 4.44 (m, —O—CH$_2$—), 6.80 to 7.75 (m, Aromatic-H), 8.13 (bs, CN—C=CH—)

Production Examples 12 to 24 and Comparative
Production Examples 1 and 2: Synthesis of
Side-Chain Liquid Crystal Polymers A-12 to A-24
and Comparative Side-Chain Liquid Crystal
Polymers A-X1 and A-X2

Side-chain liquid crystal polymers A-12 to A-24 and Comparative Side-Chain Liquid Crystal Polymers A-X1 and A-X2 were yielded in the same way as in Production Example 1, except that the non-liquid-crystal monomer was changed as shown in Table 5, and the amounts of the non-liquid-crystal monomers of Production Examples 12 to 24 and Comparative Production Examples 1 and 2 were controlled to be the same molar amount (35 mmol).

For the resultant side-chain liquid crystal polymers A-12 to A-24 and Comparative Side-Chain Liquid Crystal Polymers A-X1 and A-X2, the $^1$H-NMR analysis results are shown below.

For the side-chain liquid crystal polymers A-12 to A-24 and Comparative Side-Chain Liquid Crystal Polymers A-X1 and A-X2, the following Table 5 shows the copolymerization ratio (molar ratio) of the liquid crystal monomer to the non-liquid-crystal monomer obtained from the $^1$H-NMR analysis results, and the mass average molecular weight Mw measured by the above-mentioned GPC.

<Side-Chain Liquid Crystal Polymer A-12>
$^1$H-NMR (400 MHz, DMSO-d6, TMS): 0.60 to 1.82 (m, Alkyl-H), 3.44 to 4.60 (m, —O—CH$_2$—), 6.75 to 7.77 (m, Aromatic-H), 8.12 (bs, CN—C=CH—)

<Side-Chain Liquid Crystal Polymer A-13>
$^1$H-NMR (400 MHz, DMSO-d6, TMS): 0.47 to 1.80 (m, Alkyl-H), 3.54 to 4.30 (m, —O—CH$_2$—), 6.72 to 7.71 (m, Aromatic-H), 8.13 (bs, CN—C=CH—)

TABLE 4

| Liquid crystal polymer | Liquid crystal monomer m | Non-liquid-crystal monomer n | Copolymerization ratio m:n | Molecular weight Mw |
|---|---|---|---|---|
| A-1 | 1 (acrylate–O—(CH$_2$)$_2$—O—C$_6$H$_4$—C(O)O—C$_6$H$_4$—C$_6$H$_4$—CN) | A (acrylate–O—(CH$_2$CH$_2$O)$_4$-(CH$_2$)$_8$—CH$_3$) | 67:33 | 22000 |
| A-8 | 2 (acrylate–O—(CH$_2$)$_6$—O—C$_6$H$_4$—C(O)O—C$_6$H$_4$—C$_6$H$_4$—CN) | | 70:30 | 21500 |
| A-9 | 3 (acrylate–O—(CH$_2$)$_6$—O—C$_6$H$_4$—C(O)O—C$_6$H$_4$—C(O)O—C$_6$H$_4$—O—) | | 67:33 | 23500 |
| A-10 | 4 (acrylate–O—(CH$_2$)$_2$—O—C$_6$H$_4$—C$_6$H$_4$—C$_6$H$_4$—alkyl) | | 66:34 | 22000 |
| A-11 | 5 (acrylate–O—(CH$_2$)$_2$—O—C$_6$H$_4$—C(O)O—C$_6$H$_4$—CN) | | 66:34 | 20000 |

<Side-Chain Liquid Crystal Polymer A-14>
¹H-NMR (400 MHz, DMSO-d6, TMS): 0.55 to 1.66 (m, Alkyl-H), 2.49 (bs benzyl-H), 3.77 to 4.17 (m, —O—CH$_2$—), 6.80 to 7.73 (m, Aromatic-H), 8.11 (bs, CN—C=CH—)

<Side-Chain Liquid Crystal Polymer A-15>
¹H-NMR (400 MHz, DMSO-d6, TMS): 0.54 to 1.95 (m, Alkyl-H), 3.12 (bs, OH), 3.31 to 4.38 (m, —O—CH$_2$—, HO—CH), 6.81 to 7.99 (m, Aromatic-H), 8.13 (bs, CN—C=CH—)

<Side-Chain Liquid Crystal Polymer A-16>
¹H-NMR (400 MHz, DMSO-d6, TMS): 0.57 to 1.74 (m, Alkyl-H), 2.44 (bs benzyl-H), 3.63 to 4.20 (m, —O—CH$_2$—), 6.80 to 7.73 (m, Aromatic-H), 8.11 (bs, CN—C=CH—)

<Side-Chain Liquid Crystal Polymer A-17>
¹H-NMR (400 MHz, DMSO-d6, TMS): 0.53 to 1.74 (m, Alkyl-H), 2.29 (bs benzyl-H), 3.13 to 4.59 (m, —O—CH$_2$—), 6.72 to 7.75 (m, Aromatic-H), 8.12 (bs, CN—C=CH—)

<Side-Chain Liquid Crystal Polymer A-18>
¹H-NMR (400 MHz, DMSO-d6, TMS): 0.55 to 1.82 (m, Alkyl-H), 3.40 to 4.49 (m, —O—CH$_2$—), 6.71 to 7.68 (m, Aromatic-H), 8.12 (bs, CN—C=CH—)

<Side-Chain Liquid Crystal Polymer A-19>
¹H-NMR (400 MHz, DMSO-d6, TMS): 0.60 to 1.79 (m, Alkyl-H), 2.02 (bs,—O—CH$_2$—CH$_2$—CH$_2$—O—),3.21 to 4.50 (m, —O—CH$_2$—), 6.77 to 7.65 (m, Aromatic-H), 8.13 (bs, CN—C=CH—)

<Side-Chain Liquid Crystal Polymer A-20>
¹H-NMR (400 MHz, DMSO-d6, TMS): 0.56 to 1.76 (m, Alkyl-H), 1.98 (bs,—O—CH$_2$—CH$_2$—CH$_2$—O—),3.21 to 4.50 (m, —O—CH$_2$—), 6.80 to 7.73 (m, Aromatic-H), 8.12 (bs, CN—C=CH—)

<Side-Chain Liquid Crystal Polymer A-21>
¹H-NMR (400 MHz, DMSO-d6, TMS): 3.75 to 4.61 (m, —O—CH$_2$—), 6.73 to 7.80 (m, Aromatic-H), 8.11 (bs, CN—C=CH—)

<Side-Chain Liquid Crystal Polymer A-22>
¹H-NMR (400 MHz, DMSO-d6, TMS): 0.58 to 1.82 (m, Alkyl-H), 3.10 (bs, OH), 3.30 to 4.32 (m, —O—CH$_2$—, HO—CH), 6.89 to 7.66 (m, Aromatic-H), 8.11 (bs, CN—C=CH—)

<Side-Chain Liquid Crystal Polymer A-23>
¹H-NMR (400 MHz, DMSO-d6, TMS): 0.57 to 1.88 (m, Alkyl-H), 3.56 to 4.55 (m, —O—CH$_2$—), 6.74 to 7.80 (m, Aromatic-H), 8.12 (bs, CN—C=CH—)

<Side-Chain Liquid Crystal Polymer A-24>
¹H-NMR (400 MHz, DMSO-d6, TMS): 0.54 to 1.82 (m, Alkyl-H), 3.18 to 4.37 (m, —O—CH$_2$—, —NH—CH$_2$—), 6.71 to 7.68 (m, Aromatic-H, NH), 8.11 (bs, CN—C=CH—)

<Comparative Side-Chain Liquid Crystal Polymer A-X1>
¹H-NMR (400 MHz, DMSO-d6, TMS): 0.55 to 1.89 (m, Alkyl-H), 3.65 to 4.23 (m, —O—CH$_2$—), 6.79 to 7.73 (m, Aromatic-H), 8.17 (bs, CN—C=CH—)

<Comparative Side-Chain Liquid Crystal Polymer A-X2>
¹H-NMR (400 MHz, DMSO-d6, TMS): 0.55 to 1.89 (m, Alkyl-H), 3.61 to 4.32 (m, —O—CH$_2$—), 6.70 to 7.76 (m, Aromatic-H), 8.11 (bs, CN—C=CH—)

TABLE 5

| Liquid crystal polymer | Liquid crystal monomer m | Non-liquid-crystal monomer n | Copolymerization ratio m:n | Molecular weight Mw |
|---|---|---|---|---|
| A-12 | 1 | B | 69:31 | 24000 |
| A-13 |  | C | 67:33 | 27000 |
| A-14 |  | D (n ≈ 4) | 67:33 | 25000 |
| A-15 |  | E | 70:30 | 17500 |
| A-16 |  | F (n ≈ 8) | 68:32 | 20000 |

TABLE 5-continued
| Liquid crystal polymer | Liquid crystal monomer m | Non-liquid-crystal monomer n | Copolymerization ratio m:n | Molecular weight Mw |
|---|---|---|---|---|
| A-17 | | G 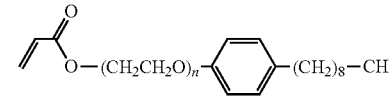 n = 16 and 17 | 73:27 | 31000 |
| A-18 | | H  | 66:34 | 23000 |
| A-19 | | I  | 67:33 | 33000 |
| A-20 | | J  | 68:32 | 24000 |
| A-21 | | K 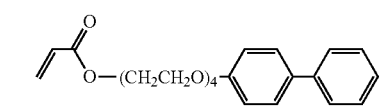 | 67:33 | 26000 |
| A-22 | | L 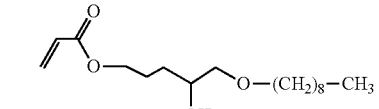 | 69:31 | 23500 |
| A-23 | | M 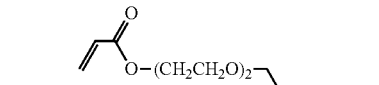 | 66:34 | 18000 |
| A-24 | | N  | 66:34 | 20000 |
| A-X1 | | O 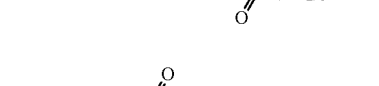 | 65:35 | 20000 |
| A-X2 | | P  | 65:35 | 20000 |

As a polymerizable liquid crystal compound, a compound represented by the following chemical formula B-1 was prepared.

Chemical Formula B-1

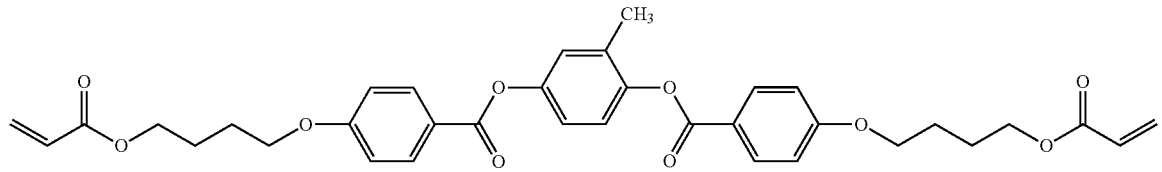

Example 1

(1) Preparation of Liquid Crystal Composition

The liquid crystal composition 1 of Example 1 was prepared by dissolving, into 400 parts by mass of cyclohexanone, 15 parts by mass of the side-chain liquid crystal polymer (A-1), 85 parts by mass of the photopolymerizable liquid crystal compound (B-1) and 4 parts by mass of a photopolymerization initiator (IRGACURE 907, manufactured by Ciba Specialty Chemicals Inc.)

(2) Production of Retardation Film or Transfer Laminate

The following four components were mixed with each other at a ratio by mass of 1/1/4/5: 2-phenoxyethyl acrylate; tetrahydrofurfuryl acrylate; dipentaerythritol triacrylate; and bis(2-vinyloxyethyl) ether. Furthermore, a product LUCIRIN TPO (manufactured by BASF Corp.) was added thereinto as a polymerization initiator to give a proportion of 4% by mass. In this way, a mixture was prepared. A PET substrate of 38 μm thickness was used, and a single surface thereof was coated with the mixture to give a cured membrane thickness of 3 μm. The membrane was irradiated with ultraviolet rays of 20 mJ/cm$^2$ to be cured.

Subsequently, the liquid crystal composition 1 was applied onto the formed cured membrane to give a cured film thickness of 1 μm, and was formed into a film. Thereafter, the film was dried at 85° C. for 120 seconds, and then irradiated with ultraviolet rays (UV) to form a retardation layer. In this way, the retardation film or transfer laminate of Example 1 was yielded.

Examples 2 to 27 and Comparative Examples 1 to 6

(1) Preparation of liquid crystal compositions 2 to 27 and Comparative liquid crystal compositions X1 to X6

Liquid crystal compositions 2 to 27 of Examples 2 to 27 and Comparative liquid crystal compositions X1 to X6 of Comparative Examples 1 to 6 were yielded in the same way as in Example 1, except that in "(1) Preparation of Liquid Crystal Composition", the type and amount (parts by mass) of the added side-chain liquid crystal polymer and the amount (parts by mass) of the added polymerizable liquid crystal compound were changed as shown in Table 6.

(2) Production of Retardation Film or Transfer Laminate

A retardation film or transfer laminate was yielded in the same way as in "(2) Production of Retardation Film or Transfer Laminate", except that each of the liquid crystal compositions 2 to 27 and the comparative liquid crystal compositions X1 to X6 was used instead of the liquid crystal composition 1.

[Evaluations]

<Evaluation for Homeotropic Alignment Property>

Each of the retardation layers of the retardation films or transfer laminates yielded in the examples and the comparative examples was transferred onto a stickiness layer-attached glass plate to produce a measurement sample, and an instrument KOBRA-WR (manufactured by Oji Scientific Instruments Co., Ltd.) was used at room temperature (23° C.) to measure the thickness direction retardation Rth (550) at a measuring wavelength of 550 nm. The homeotropic alignment property was evaluated in accordance with the following evaluating criterion. The evaluation result is shown in Table 6.

(Evaluating Criterion)
A: The Rth was less than −110 nm.
B: The Rth was −110 nm or more and less than −80 nm.
C: The Rth was −80 nm or more.
D: Not aligned, and the Rth was not measurable.

When the evaluation result is A or B, this member is excellent in homeotropic alignment property. When the evaluation result is A, the member is more excellent in homeotropic alignment property.

<Evaluation for Heat Resistance>

Each measurement sample used for the homeotropic alignment property evaluation was heated at 100° C. for 60 minutes. Before and after the heating, the thickness direction retardation Rth (550) at a measuring wavelength of 550 nm was measured at room temperature (23° C.). Using the measured values, the retardation change rate was calculated by the following formula. In accordance with the following evaluation criterion, the heat resistance was evaluated. The evaluation results are shown in Table 6.

Retardation change rate (%) after heating={(Rth before heating−Rth after heating)/Rth before heating}×100

(Evaluation Criterion)
A: The retardation change rate after the heating was 10% or less.
B: The retardation change rate after the heating was more than 10% and 14% or less.
C: The retardation change rate after the heating was more than 14%.

For Comparative Examples 1, 4 and 6, since the retardation layer was not aligned, the Rth could not be measured. Accordingly, the retardation change rate could not be obtained.

<Measurement for Liquid Crystal Alignment Temperature Range>

For the liquid crystal composition 1 yielded in Example 1 and the liquid crystal composition 16 yielded in Example 16, the temperature range in which the liquid crystal component is homeotropically aligned, was measured by the following method.

The following four components were mixed with each other at a ratio by mass of 1/1/4/5: 2-phenoxyethyl acrylate; tetrahydrofurfuryl acrylate; dipentaerythritol triacrylate; and bis(2-vinyloxyethyl) ether. Furthermore, a product LUCIRIN TPO (manufactured by BASF Corp.) was added thereinto as a polymerization initiator to give a proportion of 4% by mass. In this way, a mixture was prepared. A PET substrate of 38 μm thickness was used, and a single surface thereof was coated with the mixture to give a cured membrane thickness of 3 μm. The membrane was irradiated with ultraviolet rays of 20 mJ/cm$^2$ to be cured. Subsequently, the liquid crystal composition 1 or 16 was applied onto the formed cured membrane to give a cured film thickness of 1 μm, and was formed into a film. A total of four films were prepared by applying the liquid crystal composition 1 and dried at temperatures of 65° C., 70° C., 120° C. and 125° C. for 120 seconds each. The dried coating films were irradiated with ultraviolet rays (UV) to form retardation layers. Also, four films were prepared in the same way by applying the liquid crystal composition 16 and dried at temperatures of 50° C., 55° C., 120° C. and 125° C. for 120 seconds each. The dried coating films were irradiated with ultraviolet rays (UV) to form retardation layers.

Each of the retardation layers of the retardation films or transfer laminates was transferred onto a stickiness layer-attached glass plate to produce a measurement sample, and the thickness direction retardation Rth (550) at a measuring wavelength of 550 nm was measured.

For the liquid crystal composition 1 yielded in Example 1, when the drying temperature set to form the retardation layer was 65° C. or 125° C., the thickness direction retardation Rth (550) of the formed retardation layer was −80 nm or more, and when the drying temperature was 70° C. or 120° C., the thickness direction retardation Rth (550) was less than −80 nm. Accordingly, for the liquid crystal composition 1 yielded in Example 1, it was revealed that the temperature range in which the liquid crystal component is homeotropically aligned, is more than 65° C. and less than 125° C., and the liquid crystal component is homeotropically aligned in at least a temperature range of 70° C. or more and 120° C. or less.

For the liquid crystal composition 16 yielded in Example 16, when the drying temperature set to form the retardation layer was 50° C. or 125° C., the thickness direction retardation Rth (550) of the formed retardation layer was −80 nm or more, and when the drying temperature was 55° C. or 120° C., the thickness direction retardation Rth (550) was less than −80 nm. Accordingly, for the liquid crystal composition 16 yielded in Example 16, it was revealed that the temperature range in which the liquid crystal component is homeotropically aligned, is more than 50° C. and less than 125° C., and the liquid crystal component is homeotropically aligned in at least a temperature range of 55° C. or more and 120° C. or less.

For the liquid crystal composition 16 yielded in Example 16, it is thought that the temperature range was widened since the hydrophobic moiety Y in the constitutional unit represented by the general formula (I) or the hydrophobic moiety Y' in the constitutional unit represented by the general formula (I') contained the aromatic hydrocarbon group.

TABLE 6

|  | Side-Chain Liquid Crystal Polymer | | Polymerizable Liquid Crystal Compound | | Alignment Property | Heat Resistance |
| --- | --- | --- | --- | --- | --- | --- |
|  | Type | Amount | Type | Amount | | |
| Example 1 | A-1 | 15 | B-1 | 85 | A | A |
| Example 2 | A-1 | 25 | B-1 | 75 | A | A |
| Example 3 | A-1 | 1 | B-1 | 99 | A | A |
| Example 4 | A-2 | 15 | B-1 | 85 | A | A |
| Example 5 | A-3 | 15 | B-1 | 85 | A | A |
| Example 6 | A-4 | 15 | B-1 | 85 | A | A |
| Example 7 | A-5 | 15 | B-1 | 85 | B | A |
| Example 8 | A-6 | 15 | B-1 | 85 | A | A |
| Example 9 | A-7 | 15 | B-1 | 85 | A | A |
| Example 10 | A-8 | 15 | B-1 | 85 | A | A |
| Example 11 | A-9 | 15 | B-1 | 85 | A | A |
| Example 12 | A-10 | 15 | B-1 | 85 | A | A |
| Example 13 | A-11 | 15 | B-1 | 85 | A | A |
| Example 14 | A-12 | 15 | B-1 | 85 | A | A |
| Example 15 | A-13 | 15 | B-1 | 85 | B | A |
| Example 16 | A-14 | 15 | B-1 | 85 | A | A |
| Example 17 | A-15 | 15 | B-1 | 85 | B | A |
| Example 18 | A-16 | 15 | B-1 | 85 | A | A |
| Example 19 | A-17 | 15 | B-1 | 85 | A | A |
| Example 20 | A-18 | 15 | B-1 | 85 | A | A |
| Example 21 | A-19 | 15 | B-1 | 85 | A | A |
| Example 22 | A-20 | 15 | B-1 | 85 | A | A |
| Example 23 | A-21 | 15 | B-1 | 85 | B | A |
| Example 24 | A-22 | 15 | B-1 | 85 | B | A |
| Example 25 | A-23 | 15 | B-1 | 85 | A | A |
| Example 26 | A-24 | 15 | B-1 | 85 | A | A |
| Example 27 | A-1 | 30 | B-1 | 70 | A | B |
| Comparative Example 1 | A-X1 | 15 | B-1 | 85 | D | — |
| Comparative Example 2 | A-X1 | 30 | B-1 | 70 | C | C |
| Comparative Example 3 | A-X1 | 50 | B-1 | 50 | A | C |
| Comparative Example 4 | A-X2 | 15 | B-1 | 85 | D | — |
| Comparative Example 5 | A-X2 | 30 | B-1 | 70 | B | C |
| Comparative Example 6 | — | — | B-1 | 100 | D | — |

CONCLUSION

For Examples 1 to 27, in each of which the copolymer containing the constitutional unit represented by the general formula (I) or (I') and the liquid crystal constitutional unit containing the side chain including the liquid crystal moiety, was used as the side-chain liquid crystal polymer, the results shown in Table 6 shows that the retardation layer was excellent in homeotropic alignment property; the retardation change rate induced by heating was small; and the heat resistance was excellent. By a comparison of Examples 1 and 4 to 26 with Comparative Examples 1 and 4, it was shown that the retardation layer formed by use of the liquid crystal composition of the present disclosure, shows an improvement in homeotropic alignment property, even when the content of the side-chain liquid crystal polymer is small. By a comparison of Example 27 with Comparative Examples 2 and 5, it was shown that the retardation layer formed by use of the liquid crystal composition of the present disclosure, is less likely to cause a retardation change induced by heating and is excellent in heat resistance, even when the content of the polymerizable liquid crystal compound is decreased. For Comparative Example 3, it was shown that the heat resistance becomes insufficient when the side-chain liquid crystal polymer not containing the constitutional unit represented by the general formula (I) or (I') is used, and when the side-chain liquid crystal polymer is contained in an added amount that is needed for homeotropic alignment. Comparative Example 6 was poor in homeotropic alignment property since a side-chain liquid crystal polymer was not used.

REFERENCE SIGNS LIST

1. Retardation layer
2, 2'. Substrate
3. Alignment membrane
10, 10', 10". Retardation film
11, 21, 31. Retardation layer
12, 22, 32. Second substrate
13, 23, 33. Alignment membrane
15, 25, 35. Support peelable to be removed
16, 26, 36. Transfer layer including retardation layer
17. Interface between alignment membrane and retardation layer
27. Interface between second substrate and alignment membrane
20, 30, 40. Transfer laminate
50. Polarizing plate
60. Optical member
71. Transparent electrode layer
72. Light emitting layer
73. Electrode layer
100. Light emitting display device

The invention claimed is:
1. A liquid crystal composition comprising
a side-chain liquid crystal polymer,
a polymerizable liquid crystal compound, and
a photopolymerization initiator,
wherein the side-chain liquid crystal polymer comprises
a constitutional unit which is represented by the following general formula (I) and
a liquid crystal constitutional unit which contains a side chain including a liquid crystal moiety:

General Formula (I)

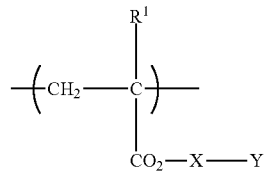

where
R$^1$ is a hydrogen atom or a methyl group;
X is a hydrophilic moiety;
Y is a hydrophobic moiety;
X as the hydrophilic moiety is:
  (x1) —(C$_2$H$_4$O)$_n$—, where n is 2 or more and 17 or less,
  (x2) a combination of a hydroxyl-substituted, saturated aliphatic hydrocarbon group containing 1 or more and 5 or less carbon atoms and at least one linking group selected from the group consisting of —O—, —O—C(=O)—, —C(=O)—O—, —NR$^2$—C(=O)— and —C(=O)—NR$^2$—, or
  (x3) a combination of —(C$_2$H$_4$O)$_{n'}$—, where n' is 1 or more and 17 or less, a saturated aliphatic hydrocarbon group containing 1 or more and 5 or less carbon atoms and optionally being substituted by a hydroxyl group, and the linking group;
R$^2$ is a hydrogen atom or a methyl group; and
Y as the hydrophobic moiety is:
  (y1) an aliphatic hydrocarbon group containing 8 or more and 22 or less carbon atoms,
  (y2) a naphthyl group,
  (y3) a combination of an aliphatic hydrocarbon group containing 1 or more and 22 or less carbon atoms and an aromatic hydrocarbon group containing 6 or more and 12 or less carbon atoms, or
  (y4) a combination of —(C$_3$H$_6$O)$_m$—, where m is 1 or more and 5 or less, and at least one selected from an aliphatic hydrocarbon group containing 4 or more and 22 or less carbon atoms and an aromatic hydrocarbon group containing 6 or more and 12 or less carbon atoms, wherein when Y is (y1), X is (x2) or (x3).

2. The liquid crystal composition according to claim 1, wherein X as the hydrophilic moiety is a divalent group wherein a specific cardinal number of an atomic group by the Davies method, is 0.5 or more and 5.7 or less; and
Y as the hydrophobic moiety is a monovalent group wherein a specific cardinal number of an atomic group by the Davies method, is −10.5 or more and −3.0 or less.

3. The liquid crystal composition according to claim 1, wherein a mass ratio of the side-chain liquid crystal polymer is 1% by mass or more and 15% by mass or less, with respect to a total mass of the side-chain liquid crystal polymer and the polymerizable liquid crystal compound.

4. The liquid crystal composition according to claim 2, wherein a mass ratio of the side-chain liquid crystal polymer is 1% by mass or more and 25% by mass or less, with respect to a total mass of the side-chain liquid crystal polymer and the polymerizable liquid crystal compound.

5. The liquid crystal composition according to claim 1, wherein the polymerizable liquid crystal compound is one or more compounds selected from compounds each represented by the following general formula (III) and compounds each represented by the following general formula (IV):

General Formula (III)

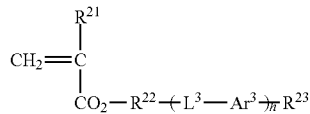

where
- $R^{21}$ represents a hydrogen atom or a methyl group;
- $R^{22}$ represents a group represented by —$(CH_2)_p$— or —$(C_2H_4O)_{p'}$—;
- $L^3$ represents a direct bond or a linking group represented by —O—, —O—C(=O)— or —C(=O)—O—;
- $Ar^a$ represents an arylene group containing 6 or more and 10 or less carbon atoms and optionally containing a substituent;
- plural $L^3$s, as well as plural $Ar^3$s, may be the same or different from each other;
- $R^{23}$ represents —F, —Cl, —CN, —$OCF_3$, —$OCF_2H$, —NCO, —NCS, —$NO_2$, —NHC(=O)—$R^{24}$, —C(=O)—$OR^{24}$, —OH, —SH, —CHO, —$SO_3H$, —$NR^{24}_2$, —$R^{25}$ or —$OR^{25}$;
- $R^{24}$ represents a hydrogen atom, or an alkyl group containing 1 or more and 6 or less carbon atoms;
- $R^{25}$ represents an alkyl group containing 1 or more and 6 or less carbon atoms;
- h is an integer of 2 or more and 4 or less; and
- p and p' are each independently an integer of 2 or more and 10 or less;

General Formula (IV)

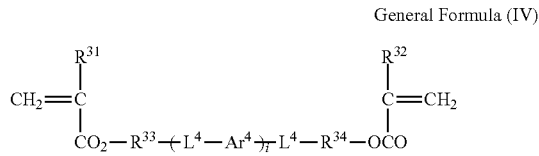

where
- $R^{31}$ and $R^{32}$ each independently represent a hydrogen atom or a methyl group;
- $R^{33}$ represents a group represented by —$(CH_2)_q$— or —$(C_2H_4O)_{q'}$—;
- $R^{34}$ represents a group represented by —$(CH_2)_r$— or —$(OC_2H_4)_{r'}$—;
- $L^4$ represents a direct bond or a linking group represented by —O—, —O—C(=O)— or —C(=O)—O—;
- $Ar^4$ represents an arylene group containing 6 or more and 10 or less carbon atoms and optionally containing a substituent;
- plural $L^4$s, as well as $Ar^4$s, may be the same or different from each other;
- i is an integer of 2 or more and 4 or less; and
- q, q', r and r' are each independently an integer of 2 or more and 10 or less.

6. The liquid crystal composition according to claim 1, wherein Y is (y1), (y3), or (y4).

7. A method for producing a retardation film, comprising forming a retardation layer by:
   forming, into a film, the liquid crystal composition defined by claim 1,
   aligning the liquid crystal constitutional unit of the side-chain liquid crystal polymer and the polymerizable liquid crystal compound in the liquid crystal composition formed into the film, and polymerizing the polymerizable liquid crystal compound after the aligning step.

8. A method for producing a retardation film, comprising forming a retardation layer by:
   forming, into a film, the liquid crystal composition defined by claim 2,
   aligning the liquid crystal constitutional unit of the side-chain liquid crystal polymer and the polymerizable liquid crystal compound in the liquid crystal composition formed into the film, and
   polymerizing the polymerizable liquid crystal compound after the aligning step.

* * * * *